US011425233B2

(12) United States Patent
Jung et al.

(10) Patent No.: US 11,425,233 B2
(45) Date of Patent: Aug. 23, 2022

(54) METHOD FOR PERFORMING WIRELESS COMMUNICATIONS AND ELECTRONIC DEVICE THEREOF

(71) Applicant: Samsung Electronics Co., Ltd., Gyeonggi-do (KR)

(72) Inventors: Euichang Jung, Gyeonggi-do (KR); Suyoung Park, Gyeonggi-do (KR); Suha Yoon, Gyeonggi-do (KR); Seho Myung, Gyeonggi-do (KR); Hyoungjoo Lee, Gyeonggi-do (KR); Jaebong Chun, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/077,190

(22) Filed: Oct. 22, 2020

(65) Prior Publication Data
US 2021/0126992 A1 Apr. 29, 2021

(30) Foreign Application Priority Data
Oct. 29, 2019 (KR) .................. 10-2019-0135491

(51) Int. Cl.
*H04M 1/02* (2006.01)
*H04B 7/0413* (2017.01)
*H04M 1/72454* (2021.01)

(52) U.S. Cl.
CPC ........ *H04M 1/0214* (2013.01); *H04B 7/0413* (2013.01); *H04M 1/72454* (2021.01)

(58) Field of Classification Search
CPC .......... H04M 1/0214; H04M 1/72448; H04M 1/72454; H04B 7/0413; H04B 7/0452
See application file for complete search history.

(56) References Cited

U.S. PATENT DOCUMENTS

| 6,785,562 B2* | 8/2004 | Lee .................. H04M 1/72403 455/566 |
| 10,123,228 B2 | 11/2018 | Moisio et al. |
| 11,070,279 B2 | 7/2021 | Raghavan et al. |
| 2002/0028662 A1 | 3/2002 | Yoshinaga |
| 2006/0101772 A1* | 5/2006 | Suzuki ............... H04M 1/0264 52/646 |
| 2011/0216064 A1 | 9/2011 | Dahl et al. |
| 2015/0105114 A1* | 4/2015 | Chou ...................... H04W 4/38 455/509 |

(Continued)

FOREIGN PATENT DOCUMENTS

| CN | 109167150 A * | 1/2019 | ............... H01Q 1/22 |
| JP | 5107804 B2 | 12/2012 | |

(Continued)

OTHER PUBLICATIONS

3GPP TS 36.306; V16.2.0 (Sep. 2020).

(Continued)

*Primary Examiner* — Keith Ferguson
(74) *Attorney, Agent, or Firm* — Cha & Reiter, LLC

(57) ABSTRACT

According to certain embodiments, a method of operating an electronic device comprises determining whether the electronic device is folded or unfolded; setting a value of a parameter based on whether the electronic device is folder or unfolded; and transmitting a first message comprising the parameter to a base station.

23 Claims, 22 Drawing Sheets

(56) References Cited

U.S. PATENT DOCUMENTS

2015/0370287 A1    12/2015  Ko et al.

FOREIGN PATENT DOCUMENTS

KR    10-2012-0106662 A    9/2012
KR    10-2017-0140976 A    12/2017

OTHER PUBLICATIONS

3GPP TS 36.331; V13.2.0 (Jun. 2016).
3GPP TS 38.214; V15.4.0 (Dec. 2018).
3GPP TS 38.300; V0.3.0 (May 2017).
3GPP TS 38.331; V15.7.0 (Sep. 2019).
3GPP TSG RAN#81; RP-182074; Sep. 2018.
3GPP TSG-RAN WG2 #103bis; Oct. 2018.
International Search Report dated Jan. 29, 2021.

* cited by examiner

METHOD FOR PERFORMING WIRELESS COMMUNICATIONS AND ELECTRONIC DEVICE THEREOF

CROSS-REFERENCE TO RELATED APPLICATION(S)

This application is based on and claims priority under 35 U.S.C. 119 from Korean Patent Application No. 10-2019-0135491, filed on Oct. 29, 2019, in the Korean Intellectual Property Office, the disclosure of which is herein incorporated by reference in its entirety.

BACKGROUND

1) Technical Field

Certain embodiments of the present disclosure relate to a method for performing wireless communication, and an electronic device thereof.

2) Description of Related Art

Recently, electronic devices such as smart phones and tablet Personal Computers (PCs) are designed for portability, and have been developed in various fields for ease of use. A foldable-type electronic device recently developed provides a relatively larger screen than a typical bar-type electronic device, and is conveniently carried since a size thereof is decreased when folded. Therefore, it has been spotlighted as an electronic device for satisfying consumer preferences.

The above information is presented as background information only to assist with an understanding of the disclosure. No determination has been made, and no assertion is made, as to whether any of the above might be applicable as prior art with regard to the disclosure.

SUMMARY

According to certain embodiments, a method of operating an electronic device comprises determining whether the electronic device is folded or unfolded; setting a value of a parameter based on whether the electronic device is folder or unfolded; and transmitting a first message comprising the parameter to a base station.

According to certain embodiments, an electronic device comprises a housing capable of changing a shape; a communication module disposed inside the housing; and at least one processor disposed inside the housing and coupled to the communication module, wherein the at least one processor is configured to: determine whether the electronic device is folded or unfolded; set a value of a parameter based on whether electronic device is folded or unfolded; and transmit a first message comprising the parameter to the base station.

According to certain embodiments, a method of operating a base station comprises receiving, from an electronic device, a message comprising a parameter related to whether the electronic device is folder or unfolded; determining a configuration related to the number of Multiple Input Multiple Output (MIMO) layers of the electronic device on the basis of a value of the parameter; and transmitting a signal to the electronic device based on the determined configuration related to the number of MIMO layers.

DETAILED DESCRIPTION

The foldable-type electronic device may have a foldable structure. The location of electrical components included in the electronic device may change, as well as their positions relative to other components, depending on whether the electronic device is folded or unfolded. Since the change in the dispositions of the components may result in a change in a hardware characteristic of the electronic device, various performance degradations may be caused when a function or setting is maintained irrespective of an exterior status of the electronic device.

Certain embodiments of the present disclosure provide a method for adaptively controlling a function or setting according to a status of an electronic device, and the electronic device thereof.

Certain embodiments of the present disclosure provide a method for reporting information on a status of an electronic device to a base station, and the electronic device thereof.

A method and an electronic device thereof according to certain embodiments can maintain performance of the electronic device despite a change in a status for folding.

Figure 1:
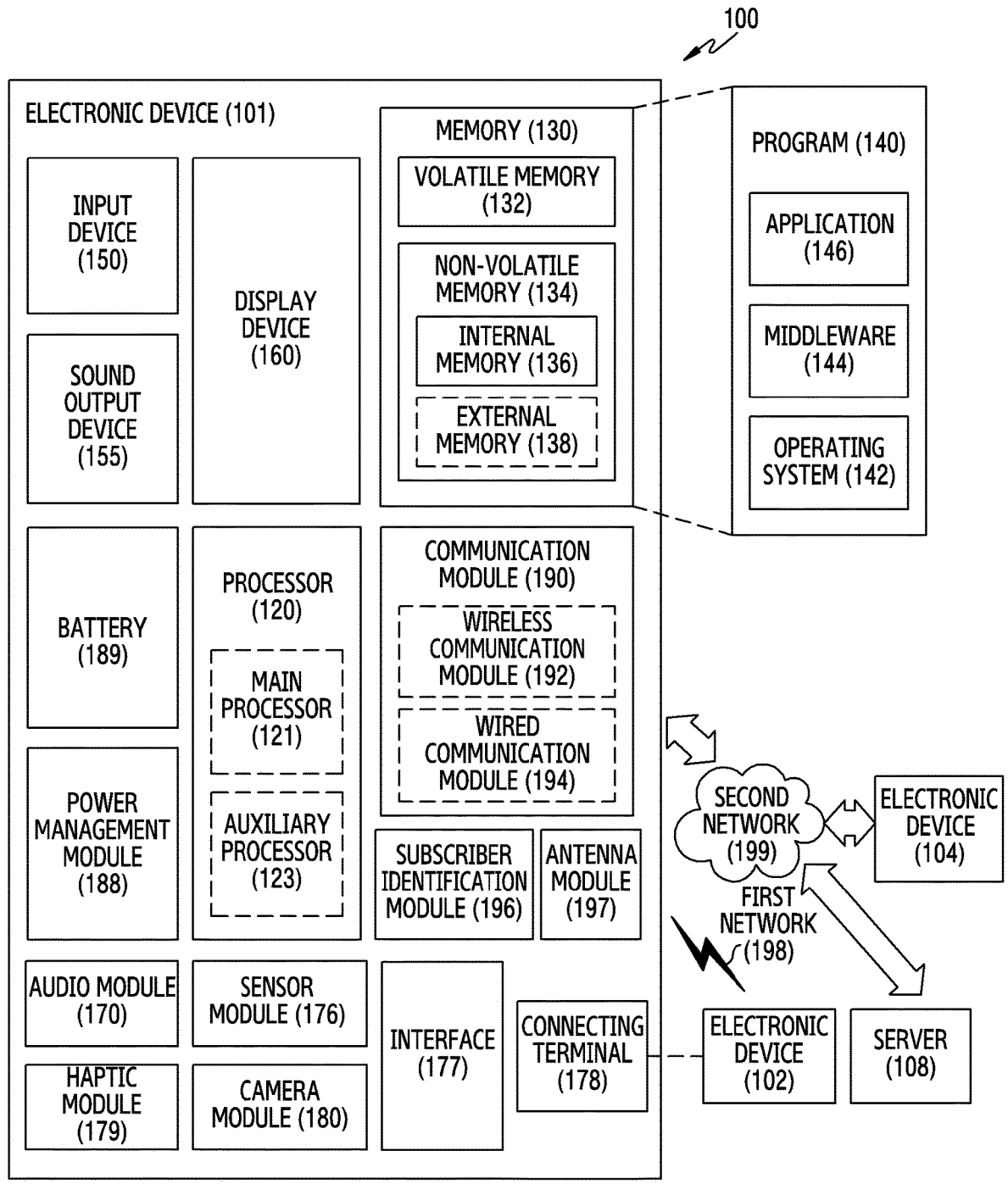
FIG. 1 is a block diagram of an electronic device in a network environment according to certain embodiments of the present disclosure.
Figure 2A:
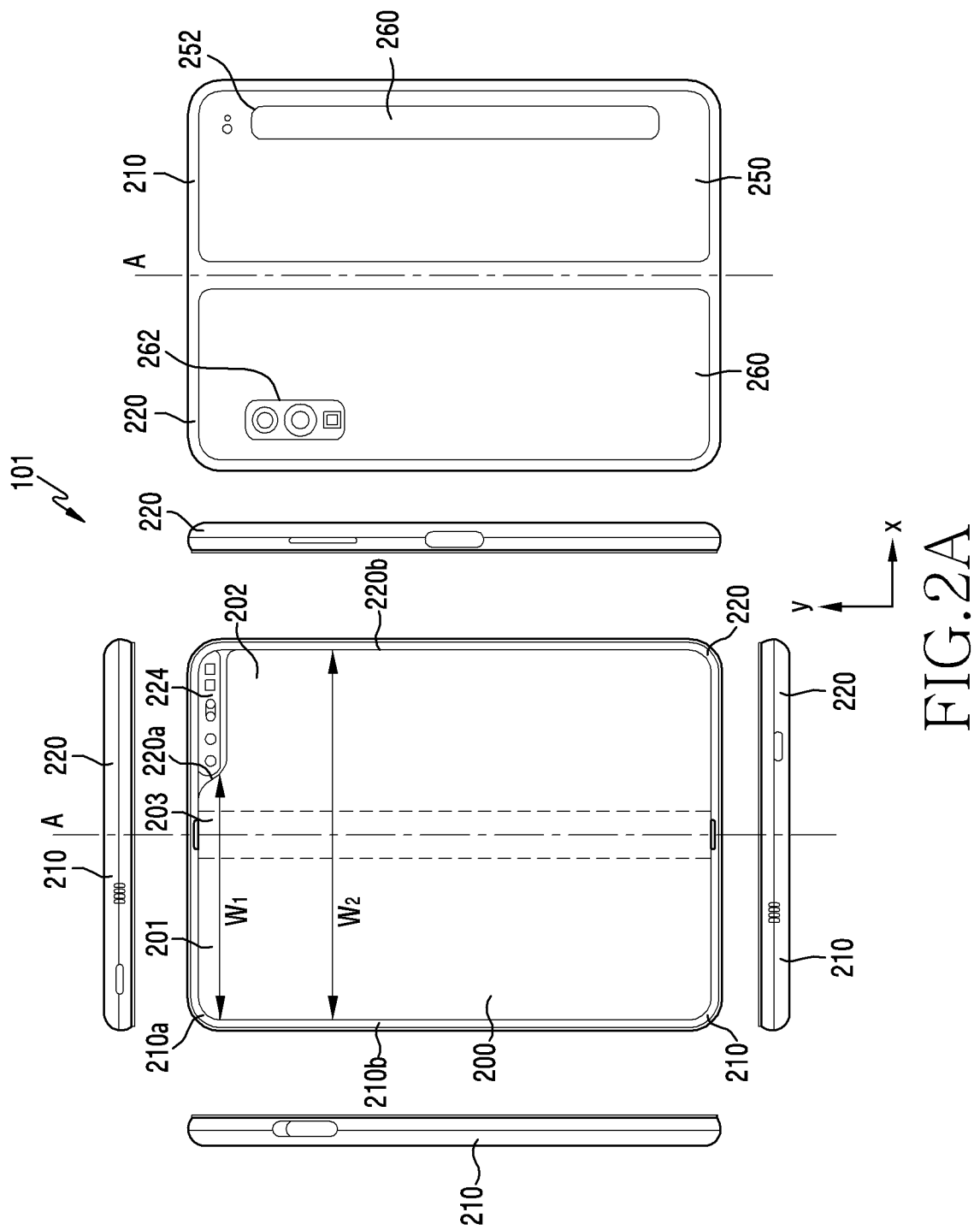
FIG. 2A illustrates an unfolded status of an electronic device according to certain embodiments of the present disclosure.
Figure 2B:
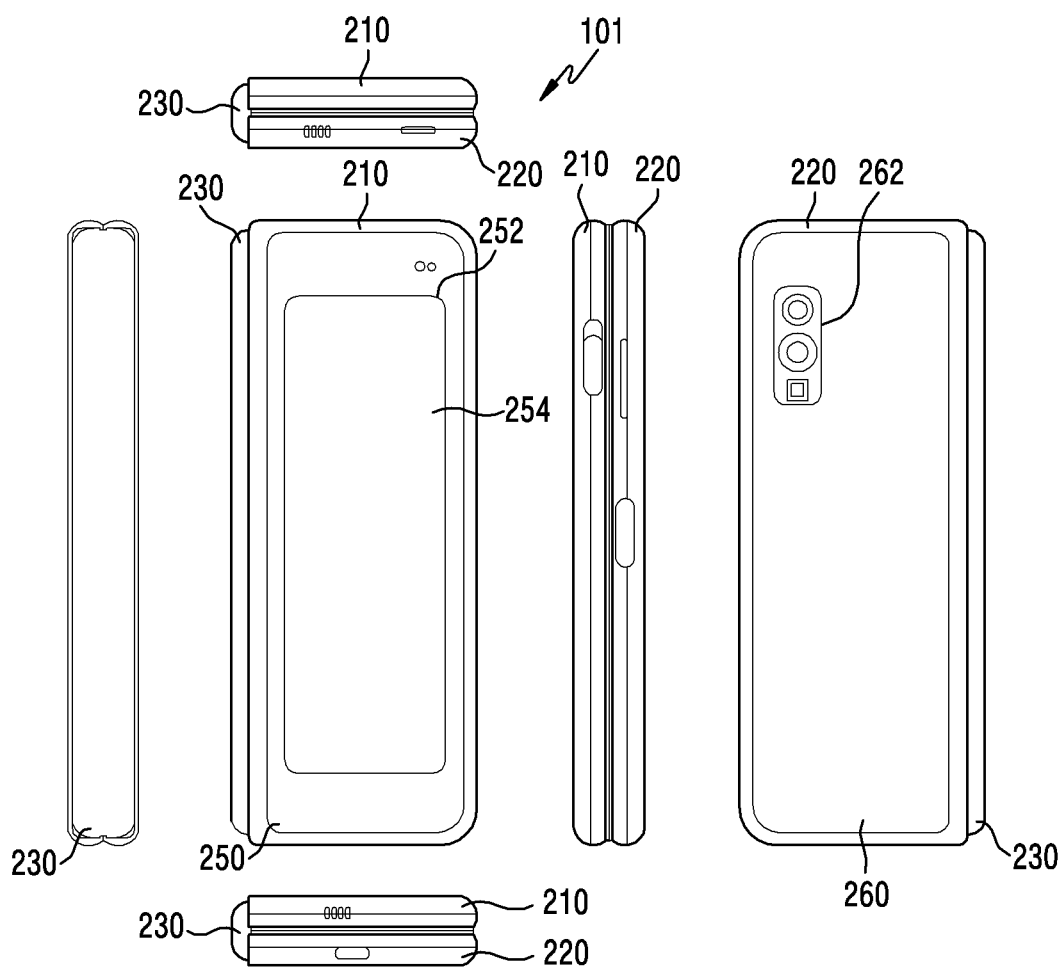
FIG. 2B illustrates a folded status of an electronic device according to certain embodiments of the present disclosure.
Figure 2C:
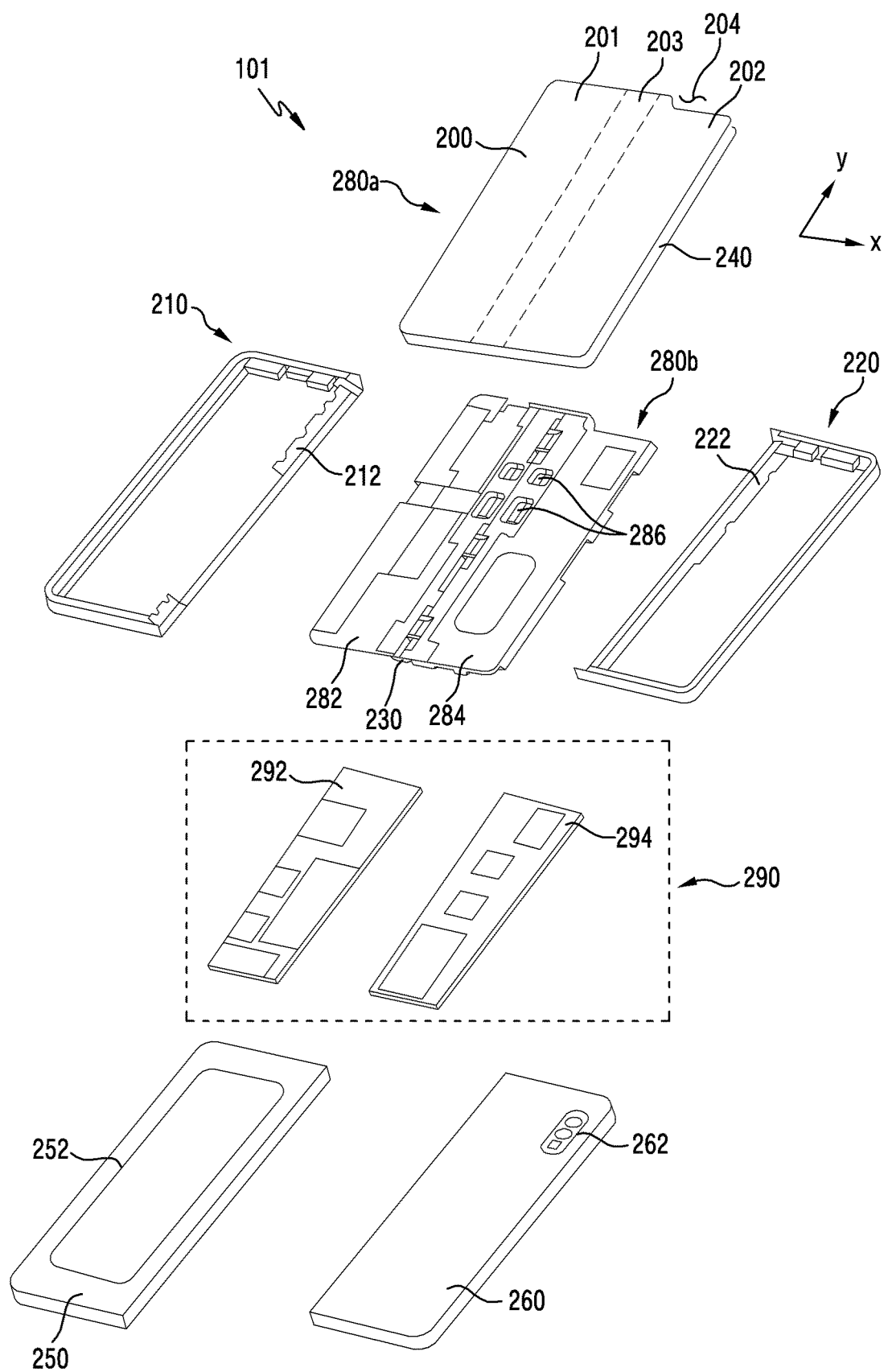
FIG. 2C is an exploded perspective view of an electronic device according to certain embodiments of the present disclosure.
Figure 3:
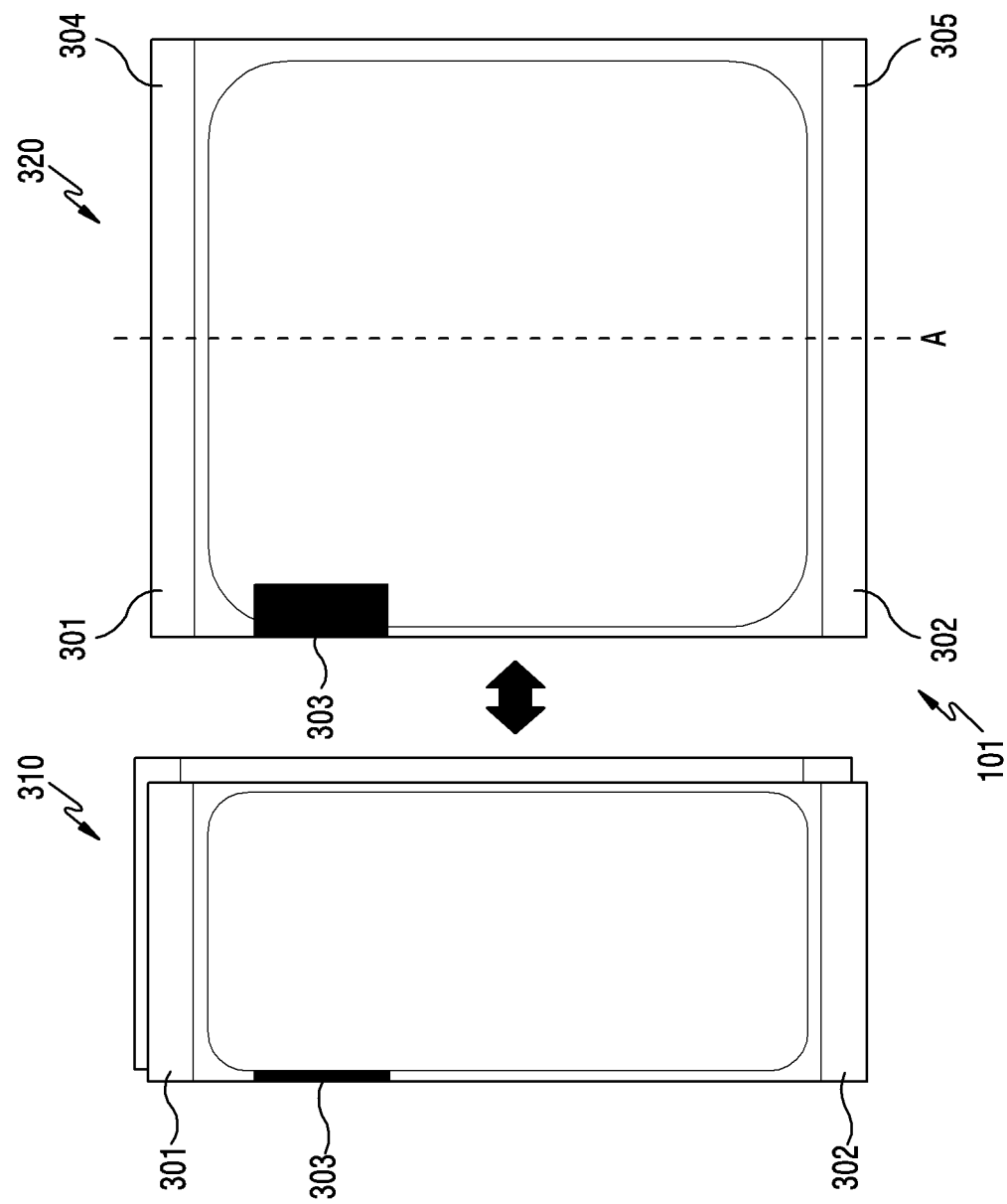
FIG. 3 illustrates an example of a change in a disposition of antennas depending on a folded status and an unfolded status in an electronic device according to certain embodiments of the present disclosure.

Certain embodiments are described in detail below with reference to the accompanying drawings. FIG. 1 is a block diagram of an electronic device 101 according to certain embodiments. FIGS. 2A, 2B, and 2C show a foldable electronic device 101, that is unfolded (FIG. 2A), folded (FIG. 2B). FIG. 3 shows how antennas have different dispositions when the electronic device is folded or unfolded. FIGS. 4-19 show the operations between a foldable electronic device and a base station.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

A larger screen for the display device 160 improves the user's experience. However, a larger display device 160 increases the size of the electronic device, and can particularly causing the electronic device to have a large planar shape. The large planar shape can make it inconvenient for the user to carry the electronic device 100, such as in a pocket or purse.

FIGS. 2A, 2B, and 2C describe a foldable electronic device, which can provide a larger display device 160 in an unfolded state, while being compact in a folded state.

FIG. 2A illustrates an foldable electronic device that is unfolded according to an embodiment. FIG. 2B illustrates a foldable electronic device that is folded according to an embodiment. Although a structure in which a device is foldable in an in-folding type is illustrated in FIG. 2A and FIG. 2B, the in-folding type is by way of example, only, and other embodiments are possible. For example, embodiments described hereinafter are also applicable to an out-folding device, a device which is foldable and in which displaying is possible for each housing, and/or a rollable-type device.

Referring to FIG. 2A and FIG. 2B, in an embodiment, the electronic device 101 may include a foldable housing 200, a hinge cover 230 which covers a foldable portion of the foldable housing, and a flexible or foldable display 211 (hereinafter, a display 211) disposed inside a space constructed by the foldable housing 200. In the present document, a face having the display 211 disposed thereon is defined as a first face or a front face of the electronic device 101. In addition, a face opposite to the front face is defined as a second face or a rear face of the electronic device 101. Further, a face surrounding a space between the front face and the rear face is defined as a third face or a side face of the electronic device 101.

In an embodiment, the foldable housing 200 may include a first housing structure 210, a second housing structure 220 including a sensor region 224, a first rear cover 250, and a second rear cover 260. The foldable housing 200 of the electronic device 101 is not limited to the type and combination shown in FIG. 2A and FIG. 2B, and may be implemented in another shape or in another union and/or combination of components. For example, in another embodiment, the first housing structure 210 and the first rear cover 250 may be constructed integrally, and the second housing structure 220 and the second rear cover 260 may be constructed integrally.

In the illustrated embodiment, the first housing structure 210 and the second housing structure 220 may be disposed at both sides about a folding axis (e.g., A-axis), and may have a generally symmetric shape about the folding axis (e.g., A-axis). As described below, the first housing structure 210 and the second housing structure 220 may have different angles or different distances according to whether a state of the electronic device 101 is an unfolded state (or unfolded), a folded state (or folded), or an intermediate state. In the illustrated embodiment, unlike the first housing structure 210, the second housing structure 220 additionally includes the sensor region 224 in which various sensors are disposed, but may have symmetric shapes in the other regions.

The electronic device being unfolded, being in an unfolded state, having an unfolded status, the housing in an unfolded state, or having an unfolded status shall have all have the same meaning, and no difference is intended by selective use of one without usage of the others. The electronic device being folded, being in an folded state, having an folded status, the housing in an folded state, or having an folded status shall have all have the same meaning, and no difference is intended by selective use of one without usage of the others. Status of the housing shall refer to whether the electronic device is folded or unfolded, having a folded state, or an unfolded state, or having a folded status, or an unfolded status, and no difference is intended by selective use of one without usage of the others.

In an embodiment, as shown in FIG. 2A, the first housing structure 210 and the second housing structure 220 may construct a recess which accommodates the display 211 together. In the illustrated embodiment, due to the sensor region 224, the recess may have two or more different widths in a direction perpendicular to the folding axis (e.g., A-axis).

For example, the recess may have a first width w1 between a first portion 210a parallel to the folding axis (e.g., A-axis) of the first housing structure 210 and a first portion 220a disposed to an edge of the sensor region 224, and a second width w2 constructed by a second portion 210b of the first housing structure 210 and a second portion 220b parallel to the folding axis (e.g., A-axis) and not corresponding to the sensor region 224. In this case, the second width w2 may be longer than the first width w1. In other words, the first portion 210a of the first housing structure 210 and the first portion 220a of the second housing structure 220 have a mutually symmetric structure and may construct the first width w1 of the recess, and the second portion 210b of the first housing structure 210 and the second portion 220b of the second housing structure 220 have a mutually symmetric structure and may construct the second width w2 of the recess. In an embodiment, the first portion 220a and second portion 220b of the second housing structure 220 may have different distances from the folding axis (e.g., A-axis). The width of the recess is for exemplary purposes only, and is not limited thereto. In certain embodiments, the recess may have a plurality of widths due to a type of the sensor region 224 or a portion having an asymmetric shape of the first housing structure 210 and second housing structure 220.

In an embodiment, at least part of the first housing structure 210 and second housing structure 220 may be constructed of a metal material or non-metal material having a rigidity and size selected to support the display 211.

In an embodiment, the sensor region 224 may be constructed to be adjacent to one corner of the second housing structure 220 and to have a specific region. However, a disposition, shape, and size of the sensor region 224 are not limited to the illustrated example. For example, in another embodiment, the sensor region 224 may be provided in another corner of the second housing structure 220 or any region between an upper corner and a lower corner. In an embodiment, components for performing various functions embodied in the electronic device 101 may be exposed to a front face of the electronic device 101 through the sensor region 224 or through one or more openings prepared in the sensor region 224. In certain embodiments, the components may include various types of sensors. The sensor may include, for example, at least one of a front camera, a receiver, and a proximity sensor.

In an embodiment, the first rear cover 250 may be disposed to one side of the folding axis (e.g., A-axis) of the rear face of the electronic device 101, and may have, for example, a substantially rectangular periphery. The periphery may be enclosed by the first housing structure 210. Similarly, the second rear cover 260 may be disposed to the other side of the folding axis (e.g., A-axis) of the rear face of the electronic device 101, and a periphery thereof may be enclosed by the second housing structure 220.

In the illustrated embodiment, the first rear cover 250 and the second rear cover 260 may have a substantially symmetric shape about the folding axis (A-axis). However, the first rear cover 250 and the second rear cover 260 do not necessarily have a mutually symmetric shape, and thus in another embodiment, the first rear cover 250 and second rear cover 260 included in the electronic device 101 may have various shapes. In another embodiment, the first rear cover 250 may be constructed integrally with the first housing structure 210, and the second rear cover 260 may be constructed integrally with the second housing structure 220.

In an embodiment, the first rear cover 250, the second rear cover 260, the first housing structure 210, and the second housing structure 220 may construct a space in which various components (e.g., a printed circuit board or a battery) of the electronic device 101 can be disposed. In an embodiment, one or more components may be disposed or visually exposed in the rear face of the electronic device 101. For example, at least part of a sub-display 254 may be visually exposed through a first rear region 252 of the first rear cover 250. In another embodiment, one or more components or a sensor may be visually exposed through a second rear region 262 of the second rear cover 260. In certain embodiments, the sensor may include a proximity sensor and/or a rear camera.

As can be seen, when the electronic device is unfolded, the user enjoys a screen with a larger width, e.g., W2.

Referring to FIG. 2B, the hinge cover 230 may be disposed between the first housing structure 210 and the second housing structure 220 to hide an internal component (e.g., a hinge structure). In an embodiment, the hinge cover 230 may be hidden by part of the first housing structure 210 and second housing structure 220 or may be exposed to the outside according to a state (a flat state/flat or a folded state/folded) of the electronic device 101.

For example, when the electronic device 101 is flat as shown in FIG. 2A, the hinge cover 230 may not be exposed by being hidden by the first housing structure 210 and the second housing structure 220. For example, when the electronic device 202 is folded (e.g., a fully folded state) as shown in FIG. 2B, the hinge cover 230 may be exposed to the outside between the first housing structure 210 and the second housing structure 220. For example, in case of an intermediate state in which the first housing structure 210 and the second housing structure 220 are folded with a certain preset angle, the hinge cover 230 may be partially exposed to the outside between the first housing structure 210 and the second housing structure 220. However, in this case, a region to be exposed may be smaller than that when fully folded. In an embodiment, the hinge cover 230 may include a curved face.

In an embodiment, the display 211 may be disposed on a space constructed by the foldable housing 200. For example, the display 211 may be mounted on a recess constructed by the foldable housing 200, and may construct most of a front face of the electronic device 101.

Accordingly, the front face of the electronic device 101 may include the display 211, some regions of the first housing structure 210 adjacent to the display 211, and some regions of the second housing structure 220. In addition, the rear face of the electronic device 101 may include the first rear cover 250, some regions of the first housing structure 210 adjacent to the first rear cover 250, and some regions of the second housing structure 220 adjacent to the second rear cover 260.

In an embodiment, the display 211 may imply a display in which at least some regions can be transformed to a flat face or a curved face. In an embodiment, the display 211 may include a folding region 203, a first region 201 disposed to one side (a left side of the folding region 203 of FIG. 2A) of the folding region 203, and a second region 202 disposed to the other side (the folding region 203 of FIG. 2A).

In an embodiment, a region of the display 211 of FIG. 2A is divided for exemplary purposes, and the display 211 may be divided into a plurality of regions (e.g., at least 4 or 2) according to a structure or a function. For example, although the region of the display 211 may be divided by the folding axis (e.g., A-axis) or the folding region 203 extending parallel to a y-axis in the embodiment of FIG. 2A, in another embodiment, the region of the display 211 may be divided according to another folding region (e.g., a folding region parallel to an x-axis) or another folding axis (e.g., a folding axis parallel to the x-axis).

In an embodiment, the first region 201 and the second region 202 may have a generally symmetric shape about the folding region 203. However, unlike the first region 201, the second region may include a cut notch according to whether the sensor region 224 exists, but in the other regions, may have a shape symmetrical to the first region 201. In other words, the first housing structure 210 and the second housing structure 220 may include portions having shapes symmetrical to each other and portions having shapes asymmetrical to each other.

Hereinafter, an operation of the first housing structure 210 and second housing structure 220 and each region of the display 211 will be described according to whether the electronic device 101 is unfolded or folded (e.g., a flat state and a folded state).

In an embodiment, when the electronic device 101 is unfolded, or in the flat state (e.g., FIG. 2A), the first housing structure 210 and the second housing structure 220 may be disposed to construct an angle of 180 degrees (or within a predetermined threshold, for example, 10 degrees, of 180 degrees) and to face the same direction. A surface of the first region 201 of the display 211 and a surface of the second region 202 may construct 180 degrees to each other, and may face the same direction (e.g., a front direction of the electronic device 101). The folding region 203 may be substantially coplanar with the first region 201 and the second region 202.

In an embodiment, when the electronic device 101 is folded or in the folded state (e.g., FIG. 2B), the first housing structure 210 and the second housing structure 220 may be disposed to face each other. A surface of the first region 201 of the display 211 and a surface of the second region 202 may construct a narrow angle (e.g., between 0 to 10 degrees) and may face each other. The folding region 203 may be constructed of a curved face at least partially having a specific curvature. As can be seen, in the folded state, the electronic device is more compact and can be more easily carried in a user's pocket or purse.

In an embodiment, when the electronic device 101 is in an intermediate state between unfolded/flat state (e.g., FIG. 2A) and the folded/folded state (e.g., FIG. 2B), the first housing structure 210 and the second housing structure 220 may be disposed to have a certain angle with each other between 0+predetermined threshold, and 180−another predetermined threshold. That is, a surface of the first region 201 of the display 211 and a surface of the second region 202 may have an angle greater than that when the electronic device is folded/in the folded state (e.g., FIG. 2B) and less than that when the electronic device is unfolded/in the flat state (e.g., FIG. 2A). At least part of the folding region 203 may be constructed of a curved face at least partially having a certain curvature. In this case, the curvature may be less than that in the folded state (e.g., FIG. 2B).

The electronic device being unfolded/in a flat state (e.g., FIG. 2A), folded/in the folded state (e.g., FIG. 2B), or the intermediate state may be classified according to an angle constructed by the surface of the first region 201 of the display 211 and the surface of the second region 202. A sensor for determining the angle may be further included, and the sensor may be disposed to an upper portion or lower portion of at least one side face of the display 211.

FIG. 2C is an exploded perspective view of the electronic device 101 according to an embodiment.

Referring to FIG. 2C, in an embodiment, the electronic device 101 may include a display unit 280a, a bracket assembly 280b, a substrate 290, a first housing structure 210, a second housing structure 220, a first rear cover 250, and a second rear cover 260. In the present document, the display unit 280a may also be called a display module or a display assembly.

In an embodiment, the display unit 280a may include a display 211 and one or more plates 240 to which the display 211 is mounted. In an embodiment, the plate 240 may be disposed between the display 211 and the bracket assembly 280b. The display 211 may be disposed to at least part of one face (e.g., an upper face of FIG. 2C) of the plate 240. The plate 240 may be constructed in a shape corresponding to the display 211. For example, some regions of the plate 240 may be constructed in a shape corresponding to a notch 204 of the display 211.

In an embodiment, the bracket assembly 280b may include a first bracket 282, a second bracket 284, a hinge structure disposed between the first bracket 282 and the second bracket 284, a hinge cover 230 which covers the hinge structure when viewed from the outside, and a wiring member 286 (e.g., a Flexible Printed Circuit Board (FPCB)) which traverses the first bracket 282 and the second bracket 284.

In an embodiment, the bracket assembly 280b may be disposed between the plate 240 and the substrate 290. For example, the first bracket 282 may be disposed between a first substrate 292 and a first region 201 of the display 211. The second bracket 284 may be disposed between a second substrate 294 and a second region 202 of the display 211.

In an embodiment, the wiring member 286 and a hinge structure 300 may be partially disposed inside the bracket assembly 280b. The wiring member 286 may be disposed in a direction (e.g., x-axis direction) which traverses the first bracket 282 and the second bracket 284. The wiring member 286 may be disposed in a direction (e.g., x-axis direction) perpendicular to a folding axis (e.g., y-axis or the folding axis A of FIG. 2A) of a folding region 203 of the electronic device 101.

In an embodiment, as mentioned above, the substrate 290 may include the first substrate 292 disposed to the first bracket 282 and the second substrate 294 disposed to the second bracket 284. The first substrate 292 and the second substrate 294 may be disposed inside a space constructed by the bracket assembly 280b, the first housing structure 210, the second housing structure 220, the first rear cover 250, and the second rear cover 260. Components for implementing various functions of the electronic device 101 may be mounted on the first substrate 292 and the second substrate 294.

In an embodiment, the first housing structure 210 and the second housing structure 220 may be assembled to be bonded at both sides of the bracket assembly 280b in a state where the display unit 280a is bonded to the bracket assembly 280b. As described below, the first housing structure 210 and the second housing structure 220 may be bonded to the bracket assembly 280b by being slid at both sides of the bracket assembly 280b.

In an embodiment, the first housing structure 210 may include a first rotation support face 212, and the second housing structure 220 may include a second rotation support face 222 corresponding to the first rotation support face 212. The first rotation support face 212 and the second rotation support face 222 may include a curved face corresponding to a curved face included in the hinge cover 230.

In an embodiment, when the electronic device 101 is in a flat state (e.g., the electronic device 101 of FIG. 2A), the first rotation support face 212 and the second rotation support face 222 may cover the hinge cover 230, and the hinge cover 230 may not be exposed to the rear face of the electronic device 101 or may be exposed to the minimum extent possible. Meanwhile, when the electronic device 101 is folded/in a folded state (e.g., the electronic device 101 of FIG. 2B), the first rotation support face 212 and the second rotation support face 222 may rotate along a curved face included in the hinge cover 230, and the hinge cover 230 may be exposed to the rear face of the electronic device 101 to the maximum extent possible.

When the electronic device 101 has a foldable structure, there may be a change in a state of a housing, and thus it may be necessary to consider a change in capability of the electronic device 101. Specifically, the position and shape of antennas within the electronic device 101 change, based on whether the electronic device is folded/in the folded states or unfolded/in the unfolded state or in an intermediate state. An example of the capability change depending on the change in the state of the housing will be described below with reference to FIG. 3. The state of the housing is a state related to a shape of the housing, and may be referred to as a bending state of the housing of the electronic device 101 or a bending state of the electronic device.

FIG. 3 illustrates an example of a change in a disposition of antennas depending on whether the electronic device is folded/in a folded status 310 and unfolded/in an unfolded status 320 according to certain embodiments of the present disclosure.

Referring to FIG. 3, the electronic device 101 (e.g., the electronic device 101 of FIG. 2A to FIG. 2C) may have a structure in which a mechanical shape can be changed. For example, the electronic device 101 may folded 310 or unfolded 320. The electronic device 101 that can be folded or unfolded as shown in FIG. 3 may be structurally designed by considering a plurality of antennas. As shown in FIG. 3, the electronic device 101 may include a first antenna unit 301, a second antenna unit 302, a third antenna unit 303, a fourth antenna unit 304, and a fifth antenna unit 305. Each of the first antenna unit 301, the second antenna unit 302, the third antenna unit 303, the fourth antenna unit 304, and the fifth antenna unit 305 may be a substantial region in which an antenna can be disposed, and the antenna can be constructed such that at least part thereof is out of a corresponding region.

In an embodiment, among the first antenna unit 301, the second antenna unit 302, the third antenna unit 303, the fourth antenna unit 304, and the fifth antenna unit 305, a first subset of antennas that can be used when the electronic device is folded 310 and a second subset of antennas that can be used when the electronic device is unfolded 320 that may be different from each other. For example, when the electronic device is folded 310, a multiple antenna scheme (e.g., a Multiple Input Multiple Output (MIMO) operation) may be applied by using the first antenna unit 301, second antenna unit 302, and/or third antenna unit 303 disposed to the front face or the rear face. In the unfolded status 320, the multiple antenna scheme based on a relatively great number of layers may be applied by using the first antenna unit 301, the second antenna unit 302, the third antenna unit 303, the fourth antenna unit 304, and the fifth antenna unit 305.

In an embodiment, it may be difficult to guarantee that MIMO diversity or multiplexing performance of the electronic device 101 when the electronic device is folded 310 is the same as when the electronic device is unfolded 320. This may be because the narrower the antenna spacing, the smaller the diversity gain, and the higher the possibility that signals distorted by passing through multiple paths experience similar characteristics.

As shown in FIG. 3, a separation distance between antennas may vary depending on a change in a status of a housing. At least N separate antennas may be required to support MIMO having a rank N (e.g., MIMO in which N pieces of different data are used in respective different antennas). There is a requirement for a separation distance of the separate antennas. In theory, $\lambda/2=c/2f$ is required as an optimal separation distance between two separate antennas. $\lambda$ is an optimal separation distance, c is a speed of propagation, and f is a frequency of a signal.

In an embodiment, when a horizontal length of the electronic device 101 is 13 cm to 15 cm, rank-2 MIMO may be supported using two separate antennas located at a bottom end or two separate antennas located at an upper end at 1.8 GHz and 2.1 GHz, but multi-rank MIMO may not be supported in a band of 800 MHz. When the status of the housing can be changed, a separation distance of about 26 cm to 30 cm may be constructed by unfolding the electronic device 101. Due to a structure of being unfolded, the optimal separation distance can be satisfied at 800 MHz which is not supported in the folded status, and rank-2 MIMO can be supported using two separate antennas located at a bottom end or two separate antennas located at an upper end. The aforementioned frequency band of 1.8 GHa, 2.1 GHz, and/or 800 MHz is for exemplary purposes only, and the present disclosure is also applicable to another frequency band (e.g., less than 6 GHz). The above examples do not exclude that the present disclosure is applied to a band of at least 6 GHz.

In an embodiment, according to certain embodiments of the present disclosure, an electronic device (e.g., the electronic device 101) may include a housing (e.g., the housing 200) capable of changing a shape, a communication module (e.g., the communication module 190) disposed inside the housing, and at least one processor (e.g., the processor 120) disposed inside the housing and coupled to the communication module. The at least one processor (e.g., the processor 120) may be configured to identify whether the electronic device is folded or unfolded, set a value of a parameter to be transmitted on the basis of whether the electronic device is folded or unfolded, and transmit a first message including the parameter to a base station.

According to certain embodiments, the first message may include any one of a message for transferring capability information and a message for transferring assist information.

According to certain embodiments, the first message may be transmitted when the electronic device (e.g., the electronic device 101) initially determines whether the electronic device is folded or unfolded or when the electronic device changes from folded to unfolded or vice versa (e.g., the housing 200).

According to certain embodiments, a determination that the electronic device is folded may include a determination that the electronic device is in an intermediate state.

According to certain embodiments, the parameter may include at least one of a parameter indicating the bending status of the housing (e.g., the housing 200), a parameter related to heating, a parameter related to the number of antenna ports, a parameter related to the number of layers supported in the electronic device (e.g., the electronic device 101), a parameter related to a size of a screen that can be displayed, a parameter related to the number of applications running in the electronic device, a parameter related to an activated display circuit, a parameter related to a User Equipment (UE) category, and a parameter related to channel quality.

According to certain embodiments, the determination of whether the electronic device is folded or unfolded (e.g., the housing 200) may be based on at least one of a measurement value of a sensor, a status of a display, a status of a display circuit, a type of a running application, and the number of running applications.

According to certain embodiments of the present disclosure, the at least one processor (e.g., the processor 120) may be configured to detect that the electronic device changes from folded to unfolded or vice versa (e.g., the housing 200), and transmit a second message to notify the changed bending sate of the housing.

According to certain embodiments of the present disclosure, the first message may include an indicator indicating that the electronic device (e.g., the electronic device 101) is foldable (e.g., the housing 200).

A service used by a user may vary depending on a type of the electronic device 101. For example, in case of a video service, since a size of a screen when the electronic device is folded is relatively smaller than when unfolded and the size of the screen when unfolded is relatively large, a higher quality service (e.g., HD service) can be provided as the electronic device changes from folded to unfolded. As another example, in case of a video call service, since the size of the screen when the electronic device is unfolded is relatively large, a higher quality service (e.g., VoLTE HD) can be provided as the electronic device changes from folded to unfolded. The change in service quality may have an effect on a wireless connection between an electronic device and a base station. For example, when the electronic device 101 is folded, the electronic device 101 may request to apply at least one of a low or mid-level data rate, deactivation of Carrier Aggregation (CA) setting, single active Bandwidth Part (BWP), and/or long Discontinuous Reception (DRX) cycle. As another example, when the electronic device 101 is unfolded, the electronic device 101 may request to apply at least one of a high data rate, activation of CA setting, use of a plurality of active BWPs, and a short DRX cycle.

In an embodiment, when the electronic device 101 changes from folded to unfolded may be utilized to predict mobility of the electronic device 101. For example, when the electronic device is folded, the electronic device 101 and base station can operate based on a high probability that a user will move. When the electronic device 101 is unfolded, the electronic device 101 and the base station can operate based on a low probability that the user will move. The prediction of user's movement based on whether the electronic device is folded or unfolded may have an effect on the wireless communication between the electronic device and the base station. For example, it may be necessary to support a short DRX cycle and/or a short measurement period by considering mid or high mobility when the electronic device is folded. As another example, it may be necessary to support a long DRX cycle and/or a long measurement period by considering low mobility when the electronic device is unfolded.

Based on the aforementioned examples, when direct or indirect information on a changed of the electronic device 101 from folded to unfolded or vice versa is provided to the base station, the base station may perform optimized resource allocation based on the provided information.

According to an example for comparison, the electronic device 101 supporting LTE/NR may have one capability information set. For example, the electronic device 101 may determine User Equipment (UE) capability according to a value determined by the maximum number of ports or the maximum number of layers supported in a baseband modem. UE capability and/or feature may be determined according to the maximum number of MIMO layers supported in the electronic device 101, and information on the UE capability and/or feature may be transmitted to the base station at a time defined in a protocol (e.g., a Radio Resource Control (RRC) configuration operation during a time of attaching to the base station) or at a time required for a communication operation.

Figure 4:
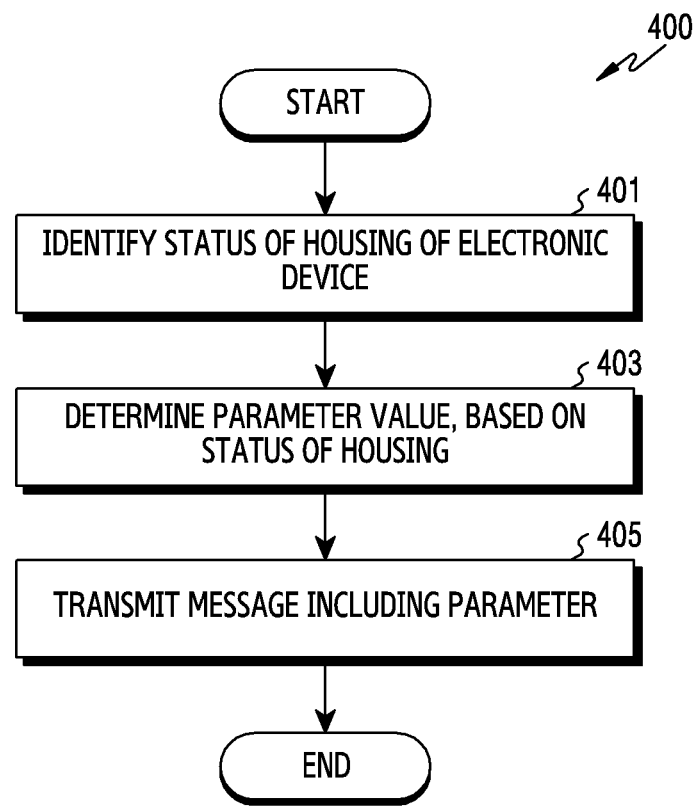
FIG. 4 is a flowchart of an electronic device for reporting status information according to certain embodiments of the present disclosure.

FIG. 4 is a flowchart 400 of the electronic device 101 for reporting status information according to certain embodiments of the present disclosure. An entity of an operation of the flowchart 400 of FIG. 4 may be understood as the electronic device 101 or components (e.g., the processor 120) of the electronic device 101.

Referring to FIG. 4, according to an embodiment, in operation 401, the electronic device 101 (e.g., the processor 120) may identify a status of a housing of the electronic device 101 (determine whether the electronic device is folded or unfolded). The status of the housing may imply one of at least. For example, the at least two statuses may include a folded status (e.g., folded/the folded status 310 of FIG. 3) and/or an unfolded status (e.g., unfolded/the unfolded status 320 of FIG. 3). As another example, the at least two statuses may further include an intermediate status of being partially folded, rather than being fully folded or unfolded. The intermediate status may be implemented by being included as one of the folded status and the unfolded status. In addition, the folded status may be divided into a dual type (e.g., a 2-step folding) or a triple type (e.g., a 3-step folding) in addition to a single type, and thus various statuses may be defined step by step. The status of the housing may be determined based on at least one of a measurement value of a sensor (e.g., a hall sensor) and an antenna performance metric. Although the following description will focus on two statuses, i.e., the folded status and the unfolded status for convenience of explanations, certain embodiments may also be applied when the intermediate status exists.

According to an embodiment, in operation 403, the electronic device 101 may determine a value of a parameter on the basis of an identified status of the housing (or whether the electronic device is folded or unfolded). According to an embodiment, the parameter may include at least one indicator explicitly indicating the identified status. According to another embodiment, a parameter value may include at least one indicator implicitly indicating the identified status. According to another embodiment, the parameter may include at least one parameter indirectly indicating the identified status. According to another embodiment, the parameter may include at least one parameter indicating information induced from the identified status. Being explicit may be understood as a scheme in which signaling is present, and being implicit may be understood as a scheme in which additional signaling is not necessary for identification when a specific condition is satisfied since it is pre-agreed in a standard specification.

According to an embodiment, in operation 405, the electronic device 101 may transmit a message including a parameter. The message may be transmitted to a base station or a core network entity which is a higher node of the base station. For example, the message may be a message defined in an RRC layer or a Media Access Control (MAC) Control Element (CE). As another example, the message may include a payload, header, or extended header of a Protocol Data Unit (PDU) used in a user plane.

Through operations as shown in FIG. 4, a status indicator of the electronic device 101, which is distinguished from a mechanism of the electronic device 101 on the basis of a change in a direct, indirect, or mechanical status, may be transferred to the base station. Hereinafter, more specific embodiments are described to report the status of the housing of the electronic device 101 or another status affected by a change in the status of the housing.

Figure 5:
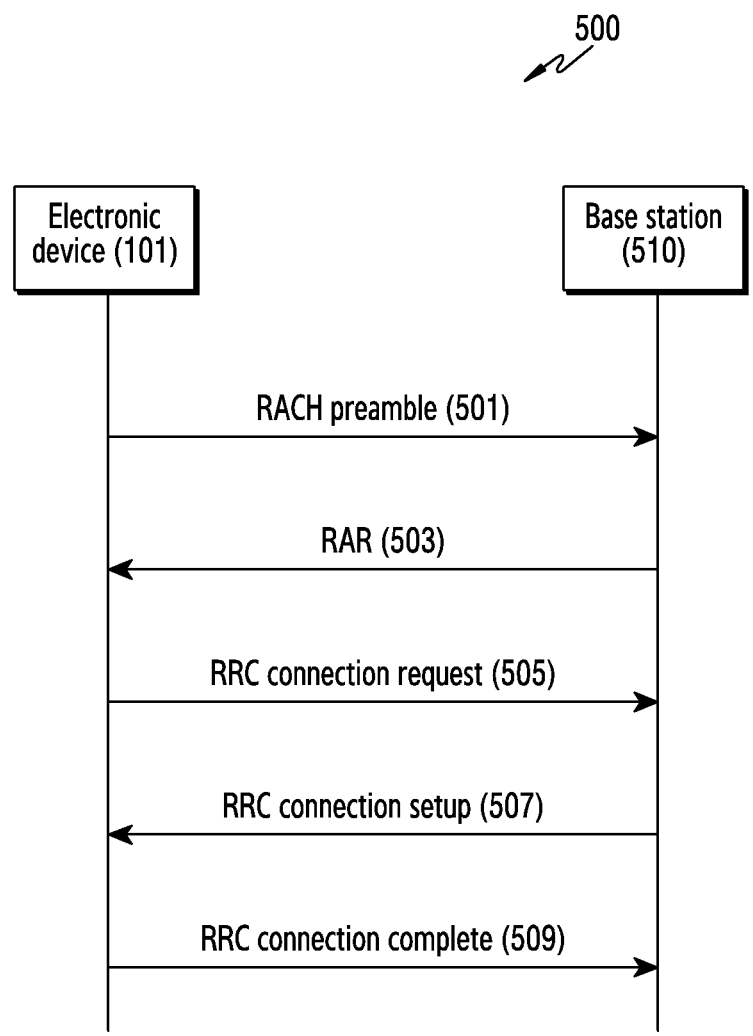
FIG. 5 is a signal exchange diagram for initial access between an electronic device and a base station according to certain embodiments of the present disclosure.

FIG. 5 is a signal exchange diagram 500 for initial access between an electronic device and a base station according to certain embodiments of the present disclosure.

Referring to FIG. 5, in operation 501, the electronic device 101 may transmit a Random Access Channel (RACH) preamble to a base station 510. The electronic device 101 may transmit the RACH preamble, to initiate a session by using a Random Access (RA)-Radio Network Temporary Identifier (RNTI).

According to an embodiment, in operation 503, the base station 510 may transmit a Random Access Response (RAR) to the electronic device 101. The base station 510 may allocate a Cell (C)-RNTI and provide information for adjusting uplink transmitting timing of the electronic device 101. The RAR may include RA-RNTI, C-RNTI, and/or timing information.

According to an embodiment, in operation 505, the electronic device 101 may transmit an RRC connection request message to the base station 510. The electronic device 101 may request for an RRC connection by using an Uplink (UL)-Shared Channel (SCH). The RRC connection request message may include C-RNTI, M (multimedia broadcast and multicast service)-RNTI, and/or establishment cause information.

According to an embodiment, in operation 507, the base station 510 may transmit an RRC connection setup message to the electronic device 101. The base station 510 may establish a Signaling Radio Bearer (SRB) and/or a Default Radio Bearer (DRB) on the basis of an establishment cause. The RRC connection setup message may include information on the SRB, information on the DRB, and/or configuration information specific to the electronic device 101.

According to an embodiment, in operation 509, the electronic device 101 may transmit an RRC connection complete message to the base station 510. The electronic device 101 may transmit Acknowledge (ACK) for SRB or DRB establishment. The RRC connection complete message may include Public Land Mobile Network (PLMN) Identifier (ID) and/or dedicated Non-access Stratum (NAS) information.

The electronic device 101 may configure RRC-related default information, by using the initial access procedure described with reference to FIG. 5. The default information may include various parameters indicating capability of the electronic device 101. For example, in an operation of transmitting the RRC connection request message, UE capability-related information may be transferred.

Figure 6:
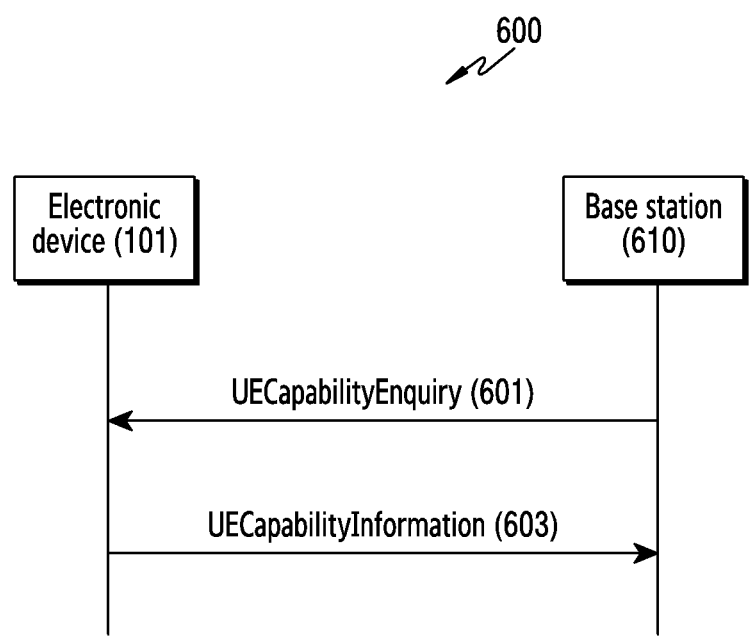
FIG. 6 is a signal exchange diagram for providing capability information between an electronic device and a base station according to certain embodiments of the present disclosure.

FIG. 6 is a signal exchange diagram 600 for providing capability information between an electronic device and a base station according to certain embodiments of the present disclosure.

Referring to FIG. 6, according to an embodiment, in operation 601, a base station 610 may transmit a UE capability enquiry message to the electronic device. The UE capability enquiry message may be a message requesting for capability information of the electronic device 101.

According to an embodiment, in operation 603, the electronic device 101 may transmit a UE capability information message to the base station 610. The UE capability information message may include capability information of the electronic device 101. The present embodiment may be performed during the RRC configuration procedure of FIG. 5 described above or RRC reconfiguration procedure of FIG. 7 described below.

Through a capability information request/response procedure of FIG. 6, information on a status of a housing of the electronic device 101 may be transferred to the base station. When an object (e.g., a Mobility Management Entity (MME) or an Access and Mobility Management Function (AMF)) in a core network (e.g., Evolved Packet Core (EPC) or 5$^{th}$ Generation Core (5GC)) does not have capability information of the electronic device 101 or when the electronic device 101 informs the core network of a change in capability information, the object in the core network may request the base station to provide the capability information of the electronic device 101. Upon receiving the request from the core network, the base station may transmit a UE capability enquiry message to request the electronic device 101 to transmit capability information. Upon receiving the UE capability enquiry message, the electronic device 101 may transmit the capability information to the base station, and the base station may provide the capability information of the electronic device 101 to the core network. In order to change the capability information of the electronic device 101, which has been transmitted from the electronic device 101 to the base station or the core network, there may be a method of transmitting new capability information to the core network through Tracking Area (TA) update.

Figure 7:
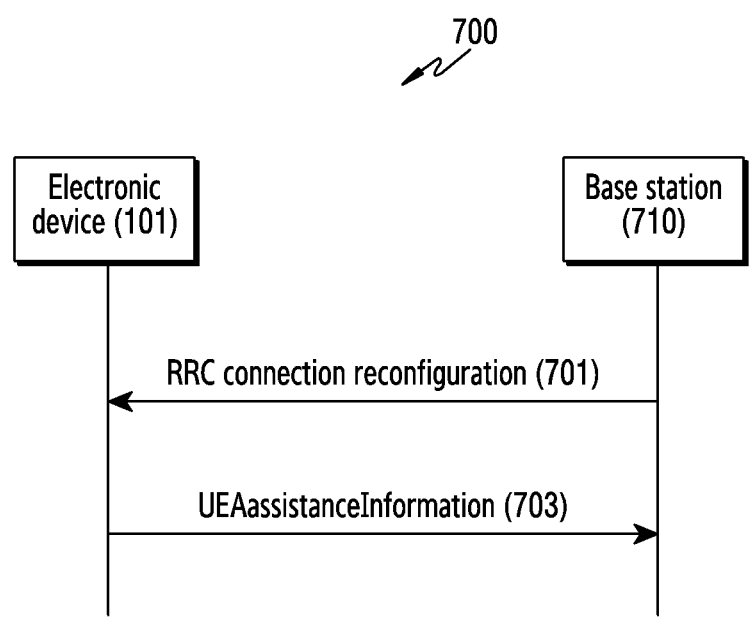
FIG. 7 is a signal exchange diagram for providing assistance information between an electronic device and a base station according to certain embodiments of the present disclosure.

FIG. 7 is a signal exchange diagram 700 for providing assistance information between an electronic device and a base station according to certain embodiments of the present disclosure.

Referring to FIG. 7, according to an embodiment, in operation 701, a base station 710 may transmit an RRC connection reconfiguration message to the electronic device 101. In operation 703, the electronic device 101 may transmit a UE assistance information message to the base station 710.

The UE assistance information message illustrated in FIG. 7 may be used by the electronic device 101 to inform the base station of a situation of the electronic device 101. Through RRC connection reconfiguration operations of FIG. 7, the electronic device 101 may transmit the UE assistance information message. The UE assistance information message may include information on at least one of power preference indications, overheating assistance information, Semi-Persistent Scheduling (SPS) assistance information, delay budget report, and maximum bandwidth preference. The UE assistance information message may include an Information Element (IE) indicating an overheating status defined as shown in Table 1 below. OverheatingAssistance-r14 of Table 1 is a message based on LTE-based 3GPP release 13, and this is by way of example, and not limitation, and thus may be replaced with a message defined in another release.

TABLE 1

```
OverheatingAssistance-r14 ::=          SEQUENCE {
    reducedUE-Category SEQUENCE {
        reducedUE-CategoryDL   INTEGER (0..19),
        reducedUE-CategoryUL   INTEGER (0..21)
    }                                  OPTIONAL,
    reducedMaxCCs SEQUENCE {
        reducedCCsDL   INTEGER (0..31),
        reducedCCsUL   INTEGER (0..31)
    }                                  OPTIONAL
}
```

By using the IE for reporting the overheating status as shown in Table 1, the electronic device 101 may indirectly report the status of the housing, or whether the electronic device is folded or unfolded. The IE related to overheating may be used to control heating of the electronic device 101 by limiting a category of the electronic device 101, a maximum bandwidth, the maximum number of CCs when CA is configured, and/or the maximum number of MIMO layers. According to an embodiment, in the IE as shown in Table 1, a value of 'reducedUE-categoryDL'/'reducedUE-categoryUL' may be determined based on at least one of the following criteria.

(1) The maximum number of MIMO layers of the electronic device 101, which can be supported in a folded status (a changed current status) or the number of MIMO layers of the electronic device 101, which is preferred by the electronic device 101 in the folded status (the changed current status)

(2) The number of MIMO layers of the electronic device 101, which is preferred by the electronic device 101 in the folded status (the changed current status)

(3) The number of MIMO layers suitable for a status (e.g., the folded status) which is used by a user for a long period of time According to another embodiment, a value of 'reducedUE-categoryDL'/'reducedUE-categoryUL' may be preferentially set based on a downlink. According to another embodiment, a value of 'reducedUE-categoryDL'/'reducedUE-categoryUL' may be preferentially set based on an uplink. According to another embodiment, a value of 'reducedUE-categoryDL'/'reducedUE-categoryUL' may be preferentially set based on a smallest or identical layer of either the downlink or the uplink.

The UE for the overheating as shown in Table 1 may be used to report a heating status of the electronic device 101 to the base station in order to decrease the number of Component Carriers (CCs) or the number of MIMO layers.

According to an embodiment, the IE for the overheating may be used to report the status of the housing (whether the electronic device is folded or unfolded) depending on a UE category, and a DL/UL MIMO layer of the electronic device 101 may be changed. For example, the electronic device 101 may set a value of 'reducedUE-CategoryDL' or 'reducedUE-CategoryUL' to the maximum number of MIMO layers that can support performance of the electronic device 101 in the folded status. A corresponding value may be set depending on capability of the electronic device 101 in the range of 0 to 19 or 0 to 21. For example, in case of supporting 8×8, 'reducedUE-CategoryDL' may be set to 8, and 'reducedUE-CategoryUL' may be set to 5. For example, in case of supporting 4×4, 'reducedUE-CategoryDL' may be set to 5. For example, in case of supporting 2×2, 'reducedUE-CategoryDL' may be set to 5.

According to another embodiment, the electronic device 101 may set a value of 'reducedUE-CategoryDL' or 'reducedUE-CategoryUL' depending on the number of preferred MIMO layers, by considering a current channel status desired by performance of the electronic device 101 in the folded status. The value of 'reducedUE-CategoryDL' or 'reducedUE-CategoryUL' may be set depending on capability of the electronic device 101 in the range of 0 to 19 or 0 to 21.

According to another embodiment, when setting a value of 'reducedUE-CategoryDL' or 'reducedUE-CategoryUL', a value of which a usage is not defined in a standard may be used. For example, the electronic device 101 may set 'reducedUE-CategoryDL' or 'reducedUE-CategoryUL' to a value greater than or equal to 19 or 21 to express a UE category indicating the folded status. For example, in case of supporting 8×8, 'reducedUE-CategoryDL' may be set to 25, and 'reducedUE-CategoryUL' may be set to 25. For example, in case of supporting 4×4, 'reducedUE-CategoryDL' may be set to 24, and 'reducedUE-CategoryUL' may be set to 24. For example, in case of supporting 2×2, 'reducedUE-CategoryDL' may be set to 23, and 'reducedUE-CategoryUL' may be set to 23. For example, in case of supporting 1×1, 'reducedUE-CategoryDL' may be set to 22, and 'reducedUE-CategoryUL' may be set to 22.

As shown in FIG. 7, a scheme of using an RRC connection reconfiguration operation may use a UE assistance information message. According to an embodiment, the UE assistance information message may be transmitted based on the folded status of the electronic device 101. The electronic device 101 may notify whether UE assistance information is supported by using a first UE capability information message. In addition to whether the UE assistance information is supported, whether a change in a status of a housing of the electronic device 101 can be changed may be further reported. In another embodiment, whether it is possible to transmit the UE assistance information message for changing the status of the housing may be reported.

According to an embodiment, when it is reported that the electronic device 101 supports transmission of the UE assistance information message, the base station may report a resource capable of transmitting the UE assistance information to the electronic device 101 through an RRC message (e.g., dedicated signaling or broadcasting signaling). When the electronic device 101 identifies that the status of the housing is changed, the electronic device 101 may transmit the UE assistance information message by using a resource (e.g., a Resource Block (RB)) allocated by the base station. For example, an IE having a value which varies depending on the change in the status of the housing of the electronic device 101 may be transmitted.

According to an embodiment, the electronic device 101 may transmit a first UE capability information message on the basis of the folded status, and when the electronic device 101 is in an unfolded status, may transmit changed capability information of the electronic device 101 by using the UE assistance information message. When the electronic device 101 is back to the folded status, the electronic device 101 may transmit a message for requesting for setting to a value transmitted by using the first UE capability information message.

According to an embodiment, the electronic device 101 may transmit the first UE capability information message (e.g., UECapabilityInformation message) on the basis of the unfolded status, and when the electronic device 101 is in the folded status, the electronic device 101 may transmit changed capability information of the electronic device 101 by using the UE assistance information message. When the electronic device 101 is back to the unfolded status, the electronic device 101 may transmit a message for requesting for setting to a value transmitted through the first UE capability information message.

According to an embodiment, when the electronic device 101 transmits the first UE assistance information message (UEAssistanceInformation message), transmission of a second UE assistance information message may be prohibited for a specific time. When the status of the housing of the electronic device 101 is changed, the electronic device 101 may transmit a message for requesting to setting to a value transmitted through the first UE capability information message. When transmitting the message for requesting for setting to a value transmitted through the first UE capability information message, a timer that cannot transmit a third UE capability information message may be applied. For example, it is possible to use a prohibit timer, and an expiry value of the prohibit timer may be configured through an RRC message (e.g., dedicated signaling or broadcasting signaling) of the base station or may be pre-defined by a standard.

According to an embodiment, a parameter that can be included in the second UE capability information message may include at least one of "Preferable data rate associated value (updated MCS/MIMO rank/CA #/multiple BWPs/supported band/band combination/total bandwidth)", "Updated DRX cycle", "Updated mobility parameter(TimeToTrigger)", "measurement reconfiguration", "Updated Power factors", and "Updated feature set".

Figure 8:
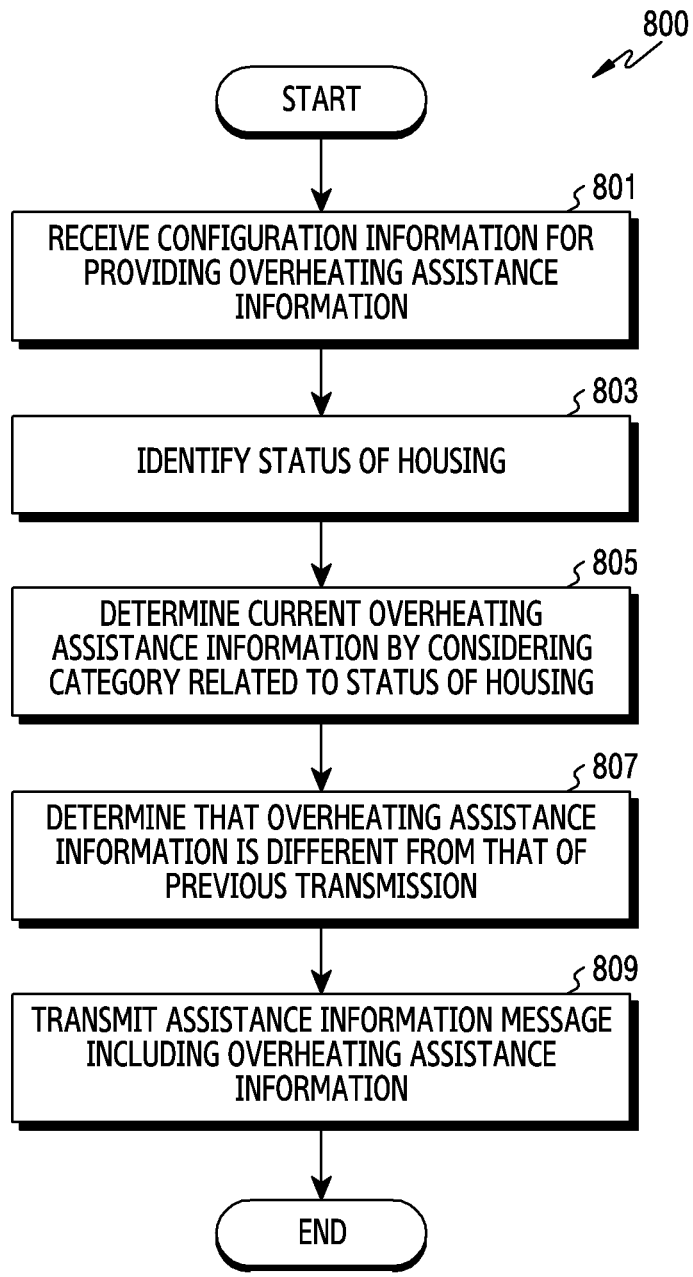
FIG. 8 is a flowchart of an electronic device for providing assistance information according to certain embodiments of the present disclosure.

FIG. 8 is a flowchart 800 of the electronic device 101 for providing assistance information according to certain embodiments of the present disclosure. An entity of an operation of the flowchart 800 of FIG. 8 may be understood as the electronic device 101 or components (e.g., the processor 120) of the electronic device 101.

Referring to FIG. 8, according to an embodiment, in operation 801, the electronic device (e.g., the processor 120 or a communication processor) may receive configuration information for providing overheating assistance information. For example, the electronic device 101 may receive from a base station a control message which requests to provide the overheating assistance information.

According to an embodiment, in operation 803, the electronic device (e.g., the processor 120 or an application processor) may identify a status of a housing. For example, the electronic device 101 may identify the status of the housing on the basis of a measurement value of a sensor. The status of the housing may imply a structural status regarding whether it is folded or unfolded. In addition, the status of the housing may further include an intermediate status of being partially folded, rather than being fully folded or unfolded. The intermediate status may be implemented by being included as one of the folded status and the unfolded status. In addition, the folded status may be divided into a dual type (e.g., a 2-step folding) or a triple type (e.g., a 3-step folding) in addition to a single type, and thus various statuses may be defined step by step.

According to an embodiment, in operation 805, the electronic device 101 may determine current overheating assistance information by considering a category related to the status of the housing. A specific value of the overheating assistance information may be determined according to one of the aforementioned certain embodiments. The value of the overheating assistance information may vary depending on the folded status.

According to an embodiment, in operation 807, the electronic device 101 may determine that the overheating assistance information is different from that of previous transmission. If there is an experience of previously transmitting the overheating assistance information, the electronic device 101 may compare a value of the previously transmitted overheating assistance information and the value determined in operation 805. The present embodiment illustrates a case where the value of the previously transmitted overheating assistance information is different from the value determined in operation 805. If there is no previous experience of previously transmitting the overheating assistance information, the electronic device 101 may determine that the values are not identical.

According to an embodiment, iation 809, the electronic device 101 may transmit an assistance information message including the overheating assistance information. The electronic device 101 may generate the control message including the overheating assistance information, and may transmit the generated control message to the base station. By transmitting the overheating assistance information, the electronic device 101 may report the status of the housing to the base station.

The embodiment of FIG. 8 illustrates operations of the electronic device 101 when the overheating assistance information is different from that of previous transmission. According to another embodiment, if the overheating assistance information is identical to that of previous transmission, the electronic device 101 may not transmit the assistance information message.

An RRC reconfiguration operation may be performed based on a message transmitted through the operations of FIG. 8. When UE capability is changed, a value of the maximum number of supported layers for spatial multiplexing in DL is changed. Therefore, the base station may dynamically indicate MIMO layers of the electronic device 101 within the changed maximum number by using a Transmission Mode (TM) depending on a Downlink Control Information (DCI) format. Table 2 below illustrates values of parameters related to layers that can be configured according to a UE category in DL, and Table 3 below illustrates values of parameters related to layers that can be configured according to a UL category in UL.

TABLE 2

| UE Category | Maximum number of DL-SCH transport block bits received within a TTI (Note 1) | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers, 64QAM)75376 (2 layers, 64QAM) | 3654144 | 2 or 4 |
| Category 7 | 301504 | 149776 (4 layers, 64QAM)75376 (2 layers, 64QAM) | 3654144 | 2 or 4 |
| Category 8 | 2998560 | 299856 | 35982720 | 8 |
| Category 9 | 452256 | 149776 (4 layers, 64QAM)75376 (2 layers, 64QAM) | 548121ᴸ⁻6 | 2 or 4 |
| Category 10 | 452256 | 149776 (4 layers, 64QAM)75376 (2 layers, 64QAM) | 5481216 | 2 or 4 |
| Category 11 | 603008 | 149776 (4 layers, 64QAM)195816 (4 layers, 256QAM)75376 (2 layers, 64QAM) 97896 (2 layers, 256QAM) | 7308288 | 2 or 4 |
| Category 12 | 603008 | 149776 (4 layers, 64QAM)195816 (4 layers, 256QAM)75376 (2 layers, 64QAM) 97896 (2 layers, 256QAM) | 7308288 | 2 or 4 |

NOTE 1:
In carrier aggregation operation, the DL-SCH processing capability can be shared by the UE with that of MCH received from a serving cell. If the total eNB scheduling for DL-SCH and an MCH in one serving cell at a given TTI is larger than the defined processing capability, the prioritization between DL-SCH and MCH is left up to UE implementation.

TABLE 3

| UE Category | Maximum number of UL-SCH transport block bits transmitted within a TTI | Maximum number of bits of an UL-SCH transport block transmitted within a TTI | Support for 64QAM in UL |
|---|---|---|---|
| Category 1 | 5160 | 5160 | No |
| Category 2 | 25456 | 25456 | No |
| Category 3 | 51024 | 51024 | No |
| Category 4 | 51024 | 51024 | No |
| Category 5 | 75376 | 75376 | Yes |
| Category 6 | 51024 | 51024 | No |
| Category 7 | 102048 | 51024 | No |
| Category 8 | 1497760 | 149776 | Yes |
| Category 9 | 51024 | 51024 | No |
| Category 10 | 102048 | 51024 | No |
| Category 11 | 51024 | 51024 | No |
| Category 12 | 102048 | 51024 | No |

As an embodiment of reporting the status of the housing, a support for a low TM using a low Channel Quality Indicator (CQI) may be taken into account. By reporting the low CQI, the electronic device 101 may induce not to select a high TM in DL when the base station determines the TM. 'AntennaInfo' which is one of RRC IEs is as shown in Table 4 below.

TABLE 4

```
AntennaInfoDedicated ::=  SEQUENCE {
    transmissionMode     ENUMERATED {
                         tm1, tm2, tm3, tm4, tm5, tm6,
                         tm7, tm8-v920},
```

In case of the folded status, the electronic device 101 may indirectly induce to select a low TM by reporting the low CQI. This may be because transmit diversity and multiplexing are supported when the CQI is high. An example of a transmission scheme based on the TM may be as shown in Table 5 below.

TABLE 5

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |
| 8 | If the UE is configured without PMI/RI reporting: if the number of PBCH antenna ports is one, single-antenna port, port 0; otherwise transmit diversityIf the UE is configured with PMI/RI reporting: closed-loop spatial multiplexing |
| 9 | Closed-loop spatial multiplexing with up to 8 layer transmission, ports 7-14 |

Table 6 illustrates Modulation and Coding Schemes (MCSs) based on a CQI index.

TABLE 6

| CQI index | modulation | code rate x 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

According to an embodiment, the electronic device 101 may configure RRC-related default information through a RACH procedure. The default information may include a variety of information indicating capability of the electronic device 101. In an RRC connection request operation (e.g., operation 505 of FIG. 5), information related to UE capability may be transferred.

According to an embodiment, after an RRC connection setup complete operation (e.g., operation 509 of FIG. 5), when a UE capability enquiry message is received from the base station, the electronic device 101 may transmit a UE capability information message to the base station. In case of the aforementioned embodiments, a scheme of limiting or changing performance of the electronic device 101 by using information related to a UE category may be used. According to another embodiment, during the electronic device 101 accesses the base station and an RRC connection is established, not the UE category but UE capability information may be transmitted, and a specific parameter may be configured or selected. When operating in a frequency band belonging to a Frequency Range 2 (FR2) defined in NR, many UE capability parameters are to be newly configured, and more UE optional capability signaling may be possible.

According to an embodiment, in initial access, maximum capability information supported in a modem (e.g., the wireless communication module 192 of FIG. 1 or a communication processor) may be transmitted without considering the status of the housing of the electronic device 101. After transmitting the maximum capability information, the electronic device 101 may identify a folded/unfolded status or a rolling-or-not status, and may change it to a value corresponding to a current status by using another message (e.g., UE assistance information message). For example, if the maximum number of DL MIMO layers that can be supported is 8×8, the electronic device 101 may change a value of a corresponding parameter to a value indicating 4×4 or 2×2 by using the UE assistance information message after the RRC reconfiguration operation. The aforementioned operation may be performed similarly for UL.

According to an embodiment, in initial access, maximum capability information supported in the modem may be transmitted by considering the status of the housing of the electronic device 101. After transmitting the maximum capability information, the electronic device 101 may identify a fold/unfold status or a rolling-or-not status, and may change a value of a parameter to a value corresponding to a current status by using another message (e.g., UE assistance information message).

According to an embodiment, in initial access, the electronic device 101 may identify whether it is in the folded status or the unfolded status, and may transmit preferred UE capability information. After transmitting the UE capability information, the electronic device 101 may optionally change the preferred UE capability information by using another message (e.g., the UE assistance information message). For example, the electronic device 101 may report a preferred DL MIMO layer with 2×2 in the folded status, and thereafter when the electronic device 101 is unfolded, the electronic device 101 may perform an RRC reconfiguration operation and then change a value of a corresponding parameter to a value indicating 4×4 or 8×8 by using the UE assistance information message. The aforementioned operation may be performed similarly for UL.

According to an embodiment, in initial access, capability information corresponding to the folded status of the electronic device 101 may be transmitted as default UE capability information. After transmitting the capability information corresponding to the folded status, the electronic device 101 may identify a fold/unfold status or a rolling-or-not status, and may change a value of a parameter to a value corresponding to a current status by using another message (e.g., UE assistance information message).

After the access is complete, the electronic device 101 may update the value of the parameter related to the status of the housing on the basis of the current status. For example, an RRC reconfiguration or a MAC CE or Uplink Control Information (UCI) may be used.

Figure 9:
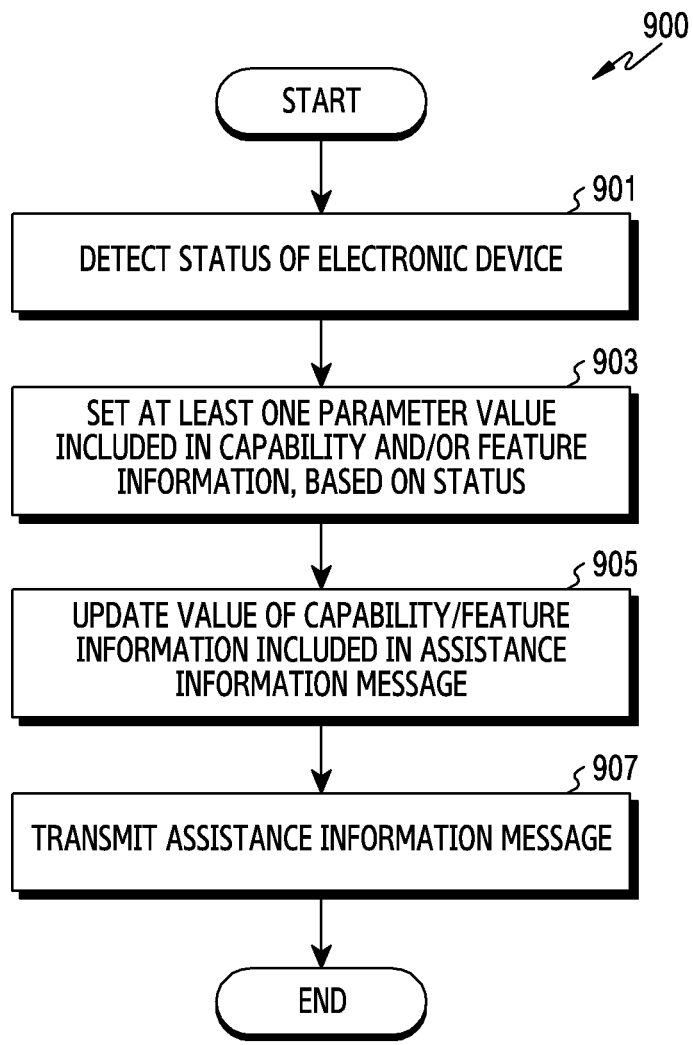
FIG. 9 is a flowchart of an electronic device for providing assistance information according to certain embodiments of the present disclosure.

FIG. 9 is a flowchart 900 of the electronic device 101 for providing assistance information according to certain embodiments of the present disclosure. An entity of an operation of the flowchart 900 of FIG. 9 may be understood as the electronic device 101 or components (e.g., the processor 120) of the electronic device 101.

Referring to FIG. 9, in operation 901, the electronic device (e.g., the processor 120) may detect a status of the electronic device 101. The electronic device 101 may detect whether a condition corresponding to the status and/or type (e.g., unfolding, folding, landscape mode, and/or hand grip) is satisfied. The condition may imply a value of at least one variable for identifying the status and/or the type. For example, the condition for the folded status may include an angle constructed by regions (e.g., the first region 201 and the second region 202) of a display.

According to an embodiment, in operation 903, the electronic device 101 may set a value of at least one parameter included in capability and/or feature information on the basis of the detected status. For example, the at least one parameter may include an indicator indicating the status of the housing, a parameter indicating information dependent on the status of the housing, and/or a parameter indirectly or implicitly indicating the status of the housing.

According to an embodiment, in operation 905, the electronic device 101 may update the value of the capability/feature information included in the assistance information message. Based on the value of the at least one parameter determined in operation 903, the electronic device 101 may determine the value of the at least one parameter included in the assistance information message.

According to an embodiment, in operation 907, the electronic device (e.g., the processor 120 or a communication processor) may transmit the assistance information message. By transmitting the assistance information message, the electronic device 101 may report the status of the housing to a base station.

According to certain embodiments, the electronic device 101 may change UE capability information temporarily, regularly, or continuously. For example, the UE capability information may vary depending on at least one of criteria described below.

(1) According to an embodiment, the electronic device 101 may report the folded/unfolded status by using an additional indication message (e.g., a folded/unfolded status indication message) or an additional IE. For example, a UE assist information for folding state may be included in the UE capability information message.

(2) According to an embodiment, the electronic device 101 may detect a user's grip by means of a sensor (e.g., the sensor module 176 of FIG. 1), and may report a grip status or an operation disable status by using an additional message. For example, an antenna module (e.g., the antenna module 197) or panel in the electronic device 101 may be identified by using a tag ID (e.g., a panel recognition identifier).

(3) According to an embodiment, the electronic device 101 may express the folded/unfolded status by using display-related information, and may report it by using an additional indication message. For example, the display-related information may include at least one of a screen ratio, a resolution (e.g., 540$p$, 720P, 1080P, 4K, 8K), a heating status, a screen direction, and/or the number of displayed applications. According to an embodiment, the display-related information may include information related to a display driving unit in the electronic device or a driving unit of a display which is turned off.

(4) According to an embodiment, the electronic device 101 may express the folded/unfolded status by using information related to a running application, and may report it by using an additional indication message. For example, the application-related information may include at least one of a type of an application (e.g., game, chatting, and/or Virtual Reality (VR)), and/or the number of running applications (e.g., at least 10).

According to certain embodiments, a parameter defined for the purpose of reporting a folding-related status or a parameter for another usage may be transferred to the base station. As an example of another parameter, an overheating assistance IE included in the UE assistance information message may be used. The overheating assistance IE may be defined as shown in Table 7 below.

TABLE 7

| OverheatingAssistance-rXX( 예: r16)::= SEQUENCE{ | | |
|---|---|---|
| reducedUE-MIMORANK | | SEQUENCE { |
| reducedUE- maxNumberMIMO-Layers(PDSCH) | | INTEGER |
| (0..2), | | |
| reducedUE- maxNumberMIMO-Layers(PUSCH) | | INTEGER |
| (0..2), | | |
| reducedUE- maxNumberMIMO-Layers(SRS) | | INTEGER |
| (0..2) | | |
| } OPTIONAL | | |

The overheating assistance IE as shown in Table 7 may be transferred as part of information related to UE capability in the RRC connection request operation. As shown in Table 7, the overheating assistance IE may be transferred as part of information related to UE capability in the RRC connection request operation. As shown in Table 7, the overheating assistance IE may be configured by considering a rank.

According to an embodiment, a value of a performance-related parameter related to UE capability may be changed depending on the status of the housing of the electronic device 101. According to an embodiment, as a folding level of the housing 200 increases, the value of the parameter may decrease step by step from a maximum value. When the status of the housing is defined not to two steps such as a folded status and/or an unfolded status but to at least three steps (e.g., an unfolded status, a folded status, a half-folded/unfolded status), the value of the parameter indicating the maximum number of MIMO layers may change sequentially depending on the folding level. It may be changed by more than two steps according to an aspect of a status change.

According to an embodiment, the electronic device 101 may report a preference of the maximum number of MIMO layers. According to another embodiment, the electronic device 101 may report a value (e.g., 'only single layer transmission support') which prohibits a plurality of layers from being used.

According to certain embodiments, at least one parameter value may vary depending on the status of the housing. According to an embodiment, the changed parameter value may be updated by another reporting. According to another embodiment, the changed parameter value may be updated or restored when another condition is satisfied without new reporting.

According to an embodiment, after the parameter value is set or changed, the parameter value may be restored when a specific time elapse. A timer which starts at a time of setting or reporting the parameter value may be defined, and the parameter value may be restored due to the expiry of the timer. For example, in response to the expiry of the timer, the electronic device 101 may re-set a parameter to a previous value.

According to another embodiment, the electronic device 101 may report a current status with a specific period of time. For periodic reporting, a Physical Uplink Shared Channel (PUSCH)/Physical Uplink Control Channel (PUCCH) allocated in a Semi-Persistent Scheduling (SPS) manner may be used.

According to another embodiment, when the status is changed, the electronic device 101 may transmit a Scheduling Request (SR) in an aperiodic manner to request for an uplink resource, may be allocated with a PUSCH/PUCCH, and may transmit a new parameter value by using the allocated PUSCH/PUCCH.

According to an embodiment, when restoring or updating the parameter value, the value may be changed by one step or two steps depending on a situation. For example, the parameter value may be restored to a status of being stored immediately before in a memory.

According to certain embodiments, the status of the housing may change frequently depending on a usage habit of a user. When the status of the housing changes frequently, the electronic device 101 may maintain a parameter value (e.g., the number of MIMO layers) of the folded status if possible. Since the user may frequently or habitually touch a device or execute/end an application, it may be preferable to apply the changed status to the parameter value under the condition that the changed status is maintained for a specific time duration.

Mapping of the status of the housing and the number of MIMO layers may be defined as follows.

(1) The maximum number of MIMO layers of the electronic device 101, which can be supported in the folded status (a changed current status), or the number of MIMO layers of the electronic device 101, which is preferred by the electronic device 101 in the folded status (the changed current status)

(2) The number of MIMO layers of the electronic device 101, which is preferred by the electronic device 101 in the folded status (the changed current status)

(3) The number of MIMO layers suitable for a status (e.g., the folded status) which is used by a user for a long period of time (4) The number of supportable MIMO layers corresponding to a user's grip status detected by a sensor, or an antenna configuration According to an embodiment, the status of the housing may be determined by another factor. The capability information message to be transferred may include a variety of capability information of the electronic device 101. As factors for identifying the status and type of the electronic device 101, at least one of the following factors may be included.

(1) A driving unit of a display (e.g., the display device 160 of FIG. 1) which is turned on in an electronic device, or a display driving unit which is turned off in the electronic device (2) A size or quality of a screen (e.g., 540$p$, 720P, 1080P, 4K, 8K)) displayed on the display in the electronic device (3) A heating status (e.g., low, medium, high) of the display in the electronic device (4) A type of an application (e.g., chatting, game, and/or VR) running in the electronic device, and the number of applications (e.g., equal to or greater than or less than 10)

According to certain embodiments, after the RRC reconfiguration operation, a request of the electronic device 101 may be used to identify a success or failure through operations of FIG. 10 and FIG. 11 below.

Figure 10:
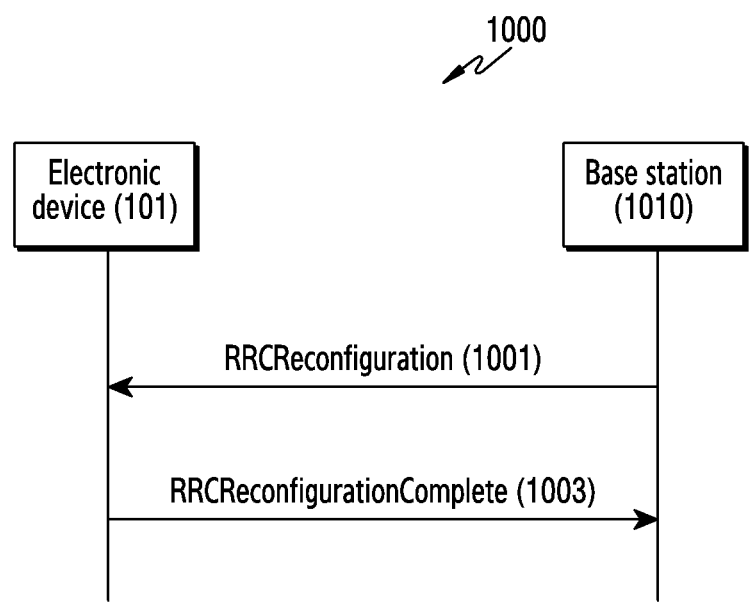
FIG. 10 is a signal exchange diagram for a Radio Resource Control (RRC) reconfiguration between an electronic device and a base station according to certain embodiments of the present disclosure.

FIG. 10 is a signal exchange diagram 1000 for an RRC reconfiguration between an electronic device and a base station according to certain embodiments of the present disclosure.

Referring to FIG. 10, in operation 1001, a base station 1010 may transmit an RRC reconfiguration message to the electronic device 101. In operation 1003, the electronic device 101 may transmit a reconfiguration complete message to the base station 1010. When the base station 1010 accepts a request of the electronic device 101, an RRC reconfiguration operation may be performed. RRC configuration parameters which are to be changed and applied through the RRC reconfiguration operation may be as follows.

Figure 11:
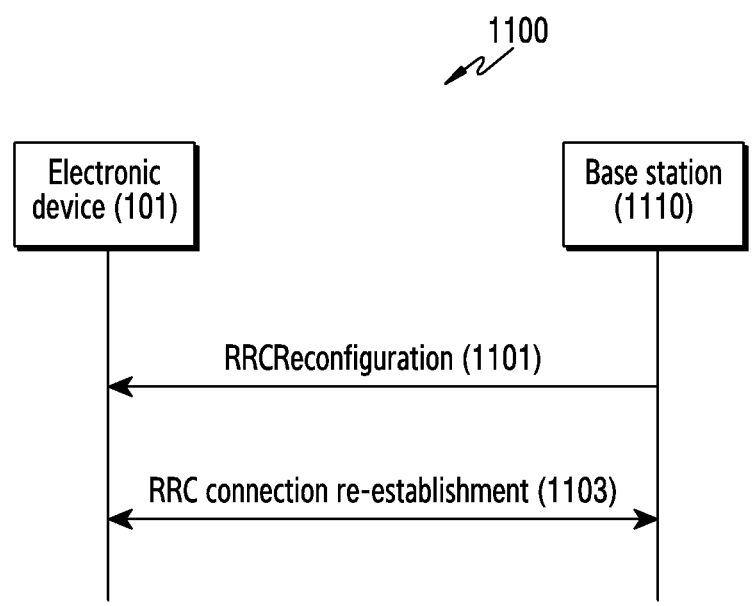
FIG. 11 is a signal exchange diagram for an RRC connection re-establishment between an electronic device and a base station according to certain embodiments of the present disclosure.

FIG. 11 is a signal exchange diagram 1100 for an RRC connection re-establishment between an electronic device and a base station according to certain embodiments of the present disclosure.

Referring to FIG. 11, in operation 1101, a base station 1110 may transmit an RRC reconfiguration message to the electronic device 101. In operation 1103, the electronic device 101 and the base station 1110 may perform an RRC connection re-establishment operation. When a request for an RRC reconfiguration of the electronic device 101 has failed, the RRC connection re-establishment operation may be performed.

RRC values which are set at initial access may be updated through the RRC reconfiguration operation. RRC parameters to be affected by a MIMO layer-related parameter changed by the electronic device 101 may be as follows.

The RRC parameter may be updated through the RRC reconfiguration operation. For example, as a MIMO rank, Reference Signal (RS) configuration, and/or beamforming-related parameter, 'FeatureSetDownlinkPerCC', 'FeatureSetUplinkPerCC', 'MIMO-Layers', 'PUSCH-Config', 'CodebookConfig', and 'SRS-Config' may be updated through the reconfiguration operation.

The base station may update at least one of the aforementioned parameters to a value preferred by the electronic device 101 or a maximum value that can be set. According to an embodiment, it may be down-adjusted with respect to an initial maximum value since 'maxNumberMIMO-LayersPDSCH', 'maxNumberMIMO-LayersCB-PUSCH', 'MIMO-LayersDL/UL', 'Codebook mode (Codebook Tx, noncodebook Tx)', 'Codebook Type1/2', 'Type1-singlepanel', 'Type2-singlepanel', 'Type1-multipanel', and/or 'Number of Antenna ports' are updated. The base station may apply a preference requested by the electronic device 101 to the parameter value, or may change it to a value corresponding to minimum capability and then up-adjust it over time. Thereafter, the electronic device 101 may identify a TM applied for communication on the basis of layer-related information and codebook-related information included in DCI (e.g., DCI 0_0, DCI 0_1, DCI 1_0, and/or DCI 1_1).

As described above, according to certain embodiments, the status of the housing of the electronic device 101 may be reported by using a parameter used to express capability information or an additional parameter, and parameter values managed by the base station may be updated. Examples of performance-related parameters associated with UE capability, which can be reported and/or updated, are described below. A candidate value of a parameter described below may be changed by an RRC configuration operation, an RRC reconfiguration operation, and an additional update operation at initial access.

Hereinafter, parameters related to MIMO and Reference Signal (RS) layer adjustment are illustrated.

TABLE 8

A. Supported maximal number of MIMO layers; Candidate values: {1, 2, 4, 8}
B. Support only a single layer transmission (limited case)
C. Codebook based PUSCH MIMO transmission
1. Supported codebook based PUSCH MIMO with maximal number of supported layers: Candidate value: {no-codebook based MIMO, 1, 2, 4}
2. Supported max number of SRS resource per set (SRS set use is configured as for codebook): Candidate value: {1, 2}
D. non-codebook based PUSCH transmission
1. Maximal number of supported layers (non-codebook transmission scheme); Candidate value: {1, 2, 3, 4}
2. Supported max number of SRS resource per set (SRS set use is configured as for non-codebook transmission); Candidate value: {1, 2, 3, 4}
3. Maximum number of simultaneous transmitted SRS resources at one symbol; Candidate value: {1, 2, 3, 4}
E. Uplink beam management ([Mandatory/Optional] with capability signaling)
1. Support of SRS based beam management; [Mandatory/Optional] with capability signaling
2. Supported max number of SRS resource per set (SRS set use is configured as for beam management).
3. Supported max number of SRS resource sets (SRS set use is configured as for beam management).

Table 9 illustrates parameters for features for each DL Component Carrier (CC).

TABLE 9

```
-- ASN1START
-- TAG-FEATURESETDOWNLINKPERCC-START
FeatureSetDownlinkPerCC ::=             SEQUENCE {
    supportedSubcarrierSpacingDL        SubcarrierSpacing,
    supportedBandwidthDL                SupportedBandwidth,
    channelBW-90mhz                     ENUMERATED {supported}
OPTIONAL,
    maxNumberMIMO-LayersPDSCH           MIMO-LayersDL
OPTIONAL,
    supportedModulationOrderDL          ModulationOrder
OPTIONAL
}
-- TAG-FEATURESETDOWNLINKPERCC-STOP
-- ASN1STOP
```

Table 10 illustrates parameters for features for each UL CC.

TABLE 10

```
-- ASN1START
-- TAG-FEATURESETUPLINKPERCC-START
FeatureSetUplinkPerCC ::=              SEQUENCE {
    supportedSubcarrierSpacingUL       SubcarrierSpacing,
    supportedBandwidthUL               SupportedBandwidth,
    channelBW-90mhz                    ENUMERATED
{supported}  OPTIONAL,
    mimo-CB-PUSCH                      SEQUENCE {
        maxNumberMIMO-LayersCB-PUSCH   MIMO-LayersUL
OPTIONAL,
```

TABLE 10-continued

```
          maxNumberSRS-ResourcePerSet        INTEGER (1..2)
    } OPTIONAL,
          maxNumberMIMO-LayersNonCB-PUSCH    MIMO-LayersUL
OPTIONAL,
          supportedModulationOrderUL         ModulationOrder
OPTIONAL
    }
-- TAG-FEATURESETUPLINKPERCC-STOP
-- ASN1STOP
```

Table 11 illustrates a parameter related to a MIMO layer.

TABLE 11

```
-- ASN1START
-- TAG-MIMO-LAYERS-START
MIMO-LayersDL ::=     ENUMERATED {twoLayers, fourLayers,
eightLayers}
     MIMO-LayersUL ::= ENUMERATED {oneLayer, twoLayers, fourLayers}
-- TAG-MIMO-LAYERS-STOP
```

Table 12 illustrates parameters related to a codebook.

TABLE 12

```
-- ASN1START
-- TAG-CODEBOOKCONFIG-START
CodebookConfig ::=                      SEQUENCE {
     codebookType                       CHOICE {
        type1                           SEQUENCE {
        subType                         CHOICE {
           typeI-SinglePanel                   SEQUENCE {
              nrOfAntennaPorts                 CHOICE {
              two                              SEQUENCE {
                 twoTX-CodebookSubsetRestriction      BIT STRING
(SIZE (6))
              },
              moreThanTwo                      SEQUENCE {
                 n1-n2                         CHOICE {
                 two-one-TypeI-SinglePanel-Restriction    BIT STRING
(SIZE (8)),
                 two-two-TypeI-SinglePanel-Restriction    BIT STRING
(SIZE (64)),
                 four-one-TypeI-SinglePanel-Restriction   BIT STRING
(SIZE (16)),
                 three-two-TypeI-SinglePanel-Restriction  BIT STRING
(SIZE (96)),
                 six-one-TypeI-SinglePanel-Restriction    BIT STRING
(SIZE (24)),
                 four-two-TypeI-SinglePanel-Restriction   BIT STRING
(SIZE (128)),
                 eight-one-TypeI-SinglePanel-Restriction  BIT STRING
(SIZE (32)),
                 four-three-TypeI-SinglePanel-Restriction BIT STRING
(SIZE (192)),
                 six-two-TypeI-SinglePanel-Restriction    BIT STRING
(SIZE (192)),
                 twelve-one-TypeI-SinglePanel-Restriction BIT STRING
(SIZE (48)),
                 four-four-TypeI-SinglePanel-Restriction  BIT STRING
(SIZE (256)),
                 eight-two-TypeI-SinglePanel-Restriction  BIT STRING
(SIZE (256)),
                 sixteen-one-TypeI-SinglePanel-Restriction BIT STRING
(SIZE (64))
                 },
                 typeI-SinglePanel-codebookSubsetRestriction-i2   BIT
STRING (SIZE (16))  OPTIONAL       -- Need R
              }
           },
```

TABLE 12-continued

```
            typeI-SinglePanel-ri-Restriction       BIT STRING (SIZE (8))
            },
            typeI-MultiPanel                      SEQUENCE {
        ng-n1-n2                                  CHOICE {
            two-two-one-TypeI-MultiPanel-Restriction       BIT STRING
(SIZE (8)),
            two-four-one-TypeI-MultiPanel-Restriction      BIT STRING
(SIZE (16)),
            four-two-one-TypeI-MultiPanel-Restriction      BIT STRING
(SIZE (8)),
            two-two-two-TypeI-MultiPanel-Restriction       BIT
STRING (SIZE (64)),
            two-eight-one-TypeI-MultiPanel-Restriction     BIT STRING
(SIZE (32)),
            four-four-one-TypeI-MultiPanel-Restriction     BIT STRING
(SIZE (16)),
            two-four-two-TypeI-MultiPanel-Restriction      BIT STRING
(SIZE (128)),
            four-two-two-TypeI-MultiPanel-Restriction      BIT STRING
(SIZE (64))
            },
            ri-Restriction                        BIT STRING (SIZE (4))
            }
        },
        codebookMode                              INTEGER (1..2)
        },
        type2                                     SEQUENCE {
    subType                                       CHOICE {
        typeII                                    SEQUENCE {
            n1-n2-codebookSubsetRestriction       CHOICE {
                two-one                           BIT STRING (SIZE (16)),
                two-two                           BIT STRING (SIZE (43)),
                four-one                          BIT STRING (SIZE (32)),
                three-two                         BIT STRING (SIZE (59)),
                six-one                           BIT STRING (SIZE (48)),
                four-two                          BIT STRING (SIZE (75)),
                eight-one                         BIT STRING (SIZE (64)),
                four-three                        BIT STRING (SIZE (107)),
                six-two                           BIT STRING (SIZE (107)),
                twelve-one                        BIT STRING (SIZE (96)),
                four-four                         BIT STRING (SIZE (139)),
                eight-two                         BIT STRING (SIZE (139)),
                sixteen-one                       BIT STRING (SIZE (128))
            },
            typeII-RI-Restriction                 BIT STRING (SIZE (2))
        },
            typeII-PortSelection                  SEQUENCE {
            portSelectionSamplingSize             ENUMERATED {n1, n2, n3, n4}
OPTIONAL, -- Need R
                typeII-PortSelectionRI-Restriction    BIT STRING (SIZE
(2))
        }
    },
        phaseAlphabetSize                         ENUMERATED {n4, n8},
        subbandAmplitude                          BOOLEAN,
        numberOfBeams                             ENUMERATED {two, three, four}
        }
    }
}
-- TAG-CODEBOOKCONFIG-STOP
-- ASN1STOP
```

Table 13 illustrates parameters regarding a physical shared channel (PUSCH).

TABLE 13

```
-- ASN1START
-- TAG-PUSCH-CONFIG-START
    PUSCH-Config ::=                              SEQUENCE {
        dataScramblingidentityPUSCH               INTEGER (0..1023)
OPTIONAL, -- Need S
        txConfig                                  ENUMERATED {codebook, nonCodebook}
OPTIONAL, -- Need S
        dmrs-UplinkForPUSCH-MappingTypeA                      SetupRelease
{ DMRS-UplinkConfig }                             OPTIONAL, -- Need M
        dmrs-UplinkForPUSCH-MappingTypeB                      SetupRelease
```

TABLE 13-continued

```
{ DMRS-UplinkConfig }                                OPTIONAL,   -- Need M
    pusch-PowerControl                                           PUSCH-PowerControl
OPTIONAL, -- Need M
    frequencyHopping                                             ENUMERATED
{intraSlot, interSlot}                               OPTIONAL,   -- Need S
    frequencyHoppingOffsetLists                                  SEQUENCE (SIZE (1..4))
OF INTEGER (1.. maxNrofPhysicalResourceBlocks-1)                 OPTIONAL,   -- Need
M
    resourceAllocation                                           ENUMERATED
{ resourceAllocationType0, resourceAllocationType1, dynamicSwitch},
    pusch-TimeDomainAllocationList                               SetupRelease
{ PUSCH-TimeDomainResourceAllocationList}                        OPTIONAL,
-- Need M
    pusch-AggregationFactor                                      ENUMERATED { n2, n4,
n8 }                           OPTIONAL,  -- Need S
    mcs-Table                                        ENUMERATED {qam256, qam64LowSE}
OPTIONAL, -- Need S
    mcs-TableTransformPrecoder                                   ENUMERATED {qam256,
qam64LowSE}                    OPTIONAL,  -- Need S
    transformPrecoder                                            ENUMERATED {enabled,
disabled}                      OPTIONAL, -- Need S
    codebookSubset                                               ENUMERATED
{fullyAndPartialAndNonCoherent, partialAndNonCoherent,
        noncoherent}                                 OPTIONAL,   -- Cond codebookBased
    maxRank INTEGER (1..4) OPTIONAL,
-- Cond codebookBased
rbg-Size                                             ENUMERATED { config2}
OPTIONAL, -- Need S
    uci-OnPUSCH    SetupRelease { UCI-OnPUSCH}                   OPTIONAL, --
Need M
    tp-pi2BPSK                                       ENUMERATED    {enabled}
OPTIONAL, -- Need S
    ...
}
UCI-OnPUSCH ::=                                                  SEQUENCE {
    betaOffsets   CHOICE {
                dynamic   SEQUENCE (SIZE (4)) OF BetaOffsets,
                semiStatic                                       BetaOffsets
    }                          OPTIONAL, -- Need M
    scaling          ENUMERATED { f0p5, f0p65, f0p8, f1 }
}
-- TAG-PUSCH-CONFIG-STOP
-- ASN1STOP
```

Table 14 illustrates parameters related to a Sounding RS (SRS).

TABLE 14

```
-- ASN1START
-- TAG-SRS-CONFIG-START
SRS-Config ::=  SEQUENCE {
    srs-ResourceSetToReleaseList                                 SEQUENCE
(SIZE(1..maxNrofSRS-ResourceSets))        OF   SRS-ResourceSetId
OPTIONAL,  -- Need N
    srs-ResourceSetToAddModList                                  SEQUENCE
(SIZE(1..maxNrofSRS-ResourceSets))        OF     SRS-ResourceSet
OPTIONAL,  -- Need N
    srs-ResourceToReleaseList                                    SEQUENCE
(SIZE(1..maxNrofSRS-Resources))           OF     SRS-ResourceId
OPTIONAL,  -- Need N
    srs-ResourceToAddModList                                     SEQUENCE
(SIZE(1..maxNrofSRS-Resources))           OF     SRS-Resource
OPTIONAL,  -- Need N
    tpc-Accumulation                       ENUMERATED        {disabled}
OPTIONAL, -- Need S
    ...
}
SRS-ResourceSet ::= SEQUENCE {
    srs-ResourceSetId SRS-ResourceSetId,
    srs-ResourceIdList   SEQUENCE (SIZE(1..maxNrofSRS-ResourcesPerSet))
OF SRS-ResourceId  OPTIONAL,  -- Cond Setup
    resourceType            CHOICE {
        aperiodic                  SEQUENCE {
            aperiodicSRS-ResourceTrigger                         INTEGER
(1..maxNrofSRS-TriggerStates-1),
            csi-RS                               NZP-CSI-RS-ResourceId
```

TABLE 14-continued

```
OPTIONAL, -- Cond NonCodebook
            slotOffset              INTEGER (1..32)       OPTIONAL,
-- Need S
            ...,
            [[
            aperiodicSRS-ResourceTriggerList-v1530        SEQUENCE
(SIZE(1..maxNrofSRS-TriggerStates-2))
                OF INTEGER (1...maxNrofSRS-TriggerStates-1)
OPTIONAL    -- Need M
            ]]
        },
        semi-persistent         SEQUENCE {
            associatedCSI-RS            NZP-CSI-RS-ResourceId  OPTIONAL,
-- Cond NonCodebook
            ...
        },
        periodic                SEQUENCE {
            associatedCSI-RS            NZP-CSI-RS-ResourceId  OPTIONAL,
-- Cond NonCodebook
            ...
        }
    },
    usage                   ENUMERATED {beamManagement, codebook,
nonCodebook, antennaSwitching},
    alpha                   Alpha    OPTIONAL, -- Need S
    p0                                         INTEGER   (-202..24)
OPTIONAL, -- Cond Setup
    pathlossReferenceRS CHOICE {
        ssb-Index                   SSB-Index,
        csi-RS-Index                NZP-CSI-RS-ResourceId
    } OPTIONAL, -- Need M
    srs-PowerControlAdjustmentStates ENUMERATED
{ sameAsFci2, separateClosedLoop}          OPTIONAL, -- Need S
    ...
}
```

Information Elements (IEs) or functions shown in Table 9 to Table 14 may be understood as examples of specifically expressing information of Table 8 applied when the base station which has received an assistance information message of the electronic device 101 performs scheduling on request and change information in the message.

In case of UE assistance information signaling, a set value may be changed depending on the status of the housing of the electronic device 101. Even if the electronic device 101 is changed to an idle status or an inactive status, a set value transmitted through the first UE assistance information message may be used until a second UE assistance information message is transmitted. In another embodiment, even if the electronic device 101 is changed to the idle status or the inactive status, the set value transmitted through the first UE assistance information message may be used until a second UE capability information message is transmitted.

According to an embodiment, an indicator indicating that the status of the housing (whether the electronic device is folder or unfolded) can be changed may be included in the UE assistance information message. When the indicator is set to a first value (e.g., 1), at least one parameter included in the UE assistance information message or at least one sub-parameter affected by the status of the housing may be used as the set value included in the UE assistance information message even if there is a change in the status of the housing of the electronic device 101.

In case of signaling of second UE capability information or temporary UE capability information, the set value may be changed depending on the status of the housing of the electronic device 101. In order to prevent frequent signaling, even if the status of the housing of the electronic device 101 is changed (folded to unfolded, or vice versa), transmission of a third UE capability information message may be prohibited before expiry of a prohibit timer which has started after transmitting the second UE capability information message or the temporary UE capability information message. An embodiment of reporting information on the status of the housing on the basis of the prohibit timer is described below with reference to FIG. 12.

Figure 12:
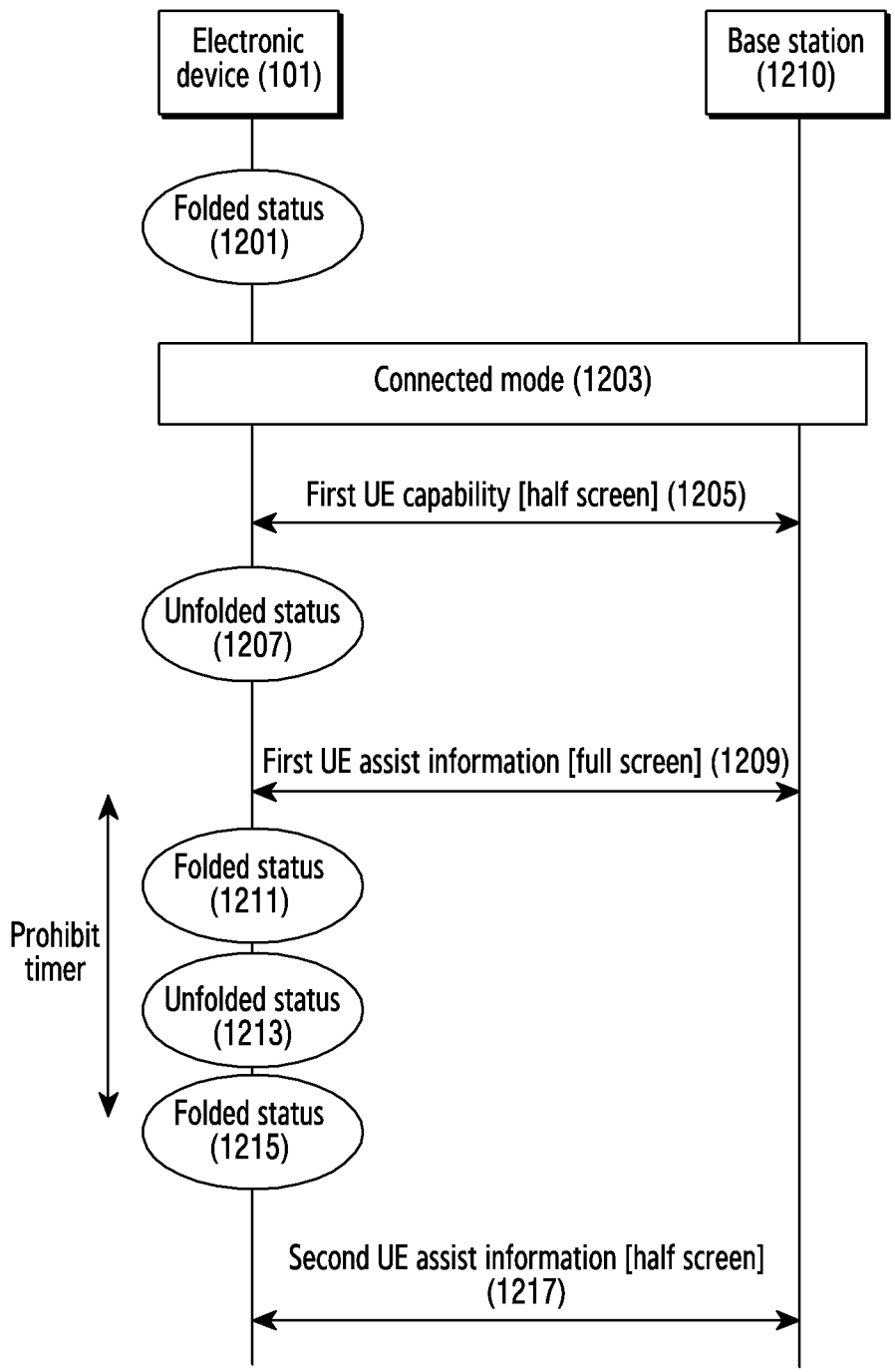
FIG. 12 is a signal exchange diagram for reporting information on a status of a housing on the basis of a prohibit timer in an electronic device according to certain embodiments of the present disclosure.

FIG. 12 is a signal exchange diagram for reporting information on a status of a housing on the basis of a prohibit timer in the electronic device 101 according to certain embodiments of the present disclosure. The prohibit timer prevents reporting of a change in the status of the housing for a predetermined time period. At the expiration of the prohibit timer, if the status of the housing is different from the status of the housing at the start of the prohibit timer, the change in status is reported to the base station.

Referring to FIG. 12, in operation 1201, the electronic device 101 may be in a folded status. In operation 1203, the electronic device 101 may access a base station 1210, and may operate in a connected mode. In operation 1205, the electronic device 101 and the base station 1210 may perform first UE capability information signaling. It may be reported that the electronic device 101 is in the folded status through the first UE capability information signaling. For example, it may be reported that it is in the folded status, by reporting that it is in a half-screen status. The half-screen status may be understood as a folded status in which a size of a display is decreased due to folding, compared to that in an unfolded status.

According to an embodiment, in operation 1207, the status of the housing of the electronic device 101 may be changed to the unfolded status, such as when a user unfolds the electronic device to view the display. In operation 1209, the electronic device 101 and the base station 1210 may perform first UE assistance information signaling. It may be reported that the electronic device 101 is in the unfolded status through the first UE assistance information signaling. For example, it may be reported that it is in the unfolded status, by reporting that it is in a full-screen status. A prohibit timer may start when the first UE assistance information signaling is performed. The full-screen status may be understood as an unfolded status in which a size of a display is increased due to unfolding, compared to that in the folded status.

According to an embodiment, in operation 1211, the status of the housing of the electronic device 101 may be changed to the folded status. Since the prohibit timer has not expired, even if the status of the housing is changed, signaling for reporting the change in the status of the housing may not be performed. In operation 1213, the status of the housing of the electronic device 101 may be changed to the unfolded status. Since the prohibit timer has not expired, even if the status of the housing is changed, signaling for reporting the changing in the status of the housing may not be performed. In operation 1215, the status of the housing of the electronic device 101 may be changed to the folded status. Since the prohibit timer has expired and a last reported status (e.g., the unfolded status) is different from a current status (e.g., the folded status), in operation 1217, the electronic device 101 and the base station 1210 may perform second UE assistance information signaling. It may be reported that the electronic device 101 is in the folded status through the second UE assistance information signaling. For example, it may be reported that it is in the folded status, by reporting that it is in a half-screen status.

As described with reference to FIG. 12, since the prohibit timer is used, an unnecessary signaling overhead caused by a frequent change in a status of a housing may be reduced. The use of the prohibit timer provides an advantage of reducing the signaling overhead, but there may be a time duration in which a current status cannot be applied. A scheme of reporting a changed status even before the prohibit timer expires if the changed status is maintained for at least a specific time may be selected in order to reduce the time duration in which the current status is not applied. A timer for identifying a specific time may be called a 'maintain timer'. An embodiment of using the maintain timer is described below with reference to FIG. 13.

Figure 13:
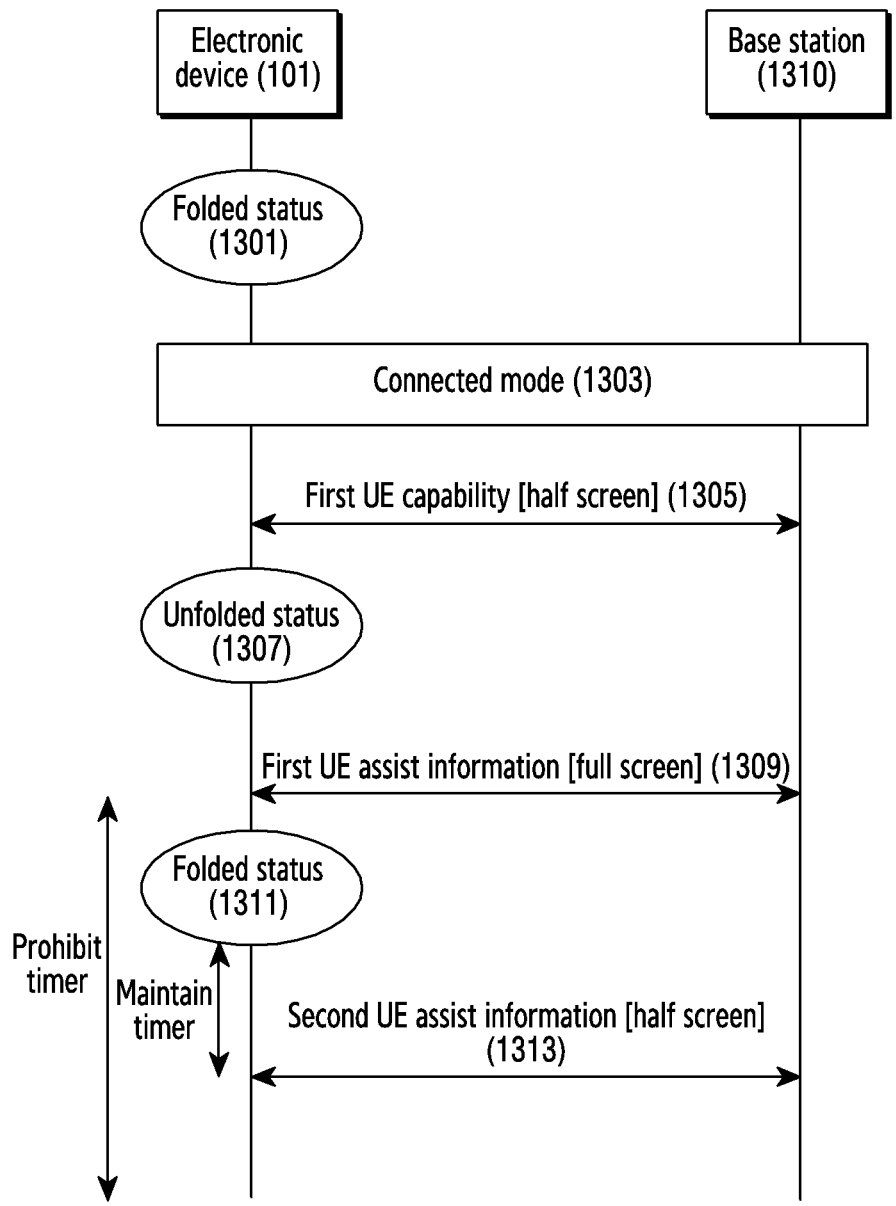
FIG. 13 is a signal exchange diagram for reporting information on a status of a housing on the basis of a prohibit timer and a maintain timer in an electronic device according to certain embodiments of the present disclosure.

FIG. 13 is a signal exchange diagram for reporting information on a status of a housing on the basis of a prohibit timer and a maintain timer in the electronic device 101 according to certain embodiments of the present disclosure. During the prohibition timer, no change in the status of the housing is reported to the base station, UNLESS: the changed status is maintained for a period of time exceeding the maintenance timer.

Referring to FIG. 13, in operation 1301, the electronic device 101 may be in a folded status. In operation 1303, the electronic device 101 may access a base station 1310, and may operate in a connected mode. In operation 1305, the electronic device 101 and the base station 1310 may perform first UE capability information signaling. It may be reported that the electronic device 101 is in the folded status through the first UE capability information signaling. For example, it may be reported that it is in the folded status, by reporting that it is in a half-screen status. The half-screen status may be understood as a folded status in which a size of a display is decreased due to folding, compared to that in an unfolded status.

According to an embodiment, in operation 1307, the status of the housing of the electronic device 101 may be changed to the unfolded status. In operation 1309, the electronic device 101 and the base station 1310 may perform first UE assistance information signaling. It may be reported that the electronic device 101 is in the unfolded status through the first UE assistance information signaling. For example, it may be reported that it is in the unfolded status, by reporting that it is in a full-screen status. A prohibit timer may start when the first UE assistance information signaling is performed. The full-screen status may be understood as an unfolded status in which a size of a display is increased due to unfolding, compared to that in the folded status.

According to an embodiment, in operation 1311, the status of the housing of the electronic device 101 may be changed to the folded status. Since the prohibit timer has not expired, even if the status of the housing is changed, signaling for reporting the change in the status of the housing may not be performed. Although the signaling is not performed, a maintain timer may start according to the change in the status. Although the prohibit timer has not expired, in operation 1313, since the maintain timer has expired, the electronic device 101 and the base station 1310 may perform second UE assistance information signaling. It may be reported that the electronic device 101 is in the folded status through the second UE assistance information signaling. For example, it may be reported that it is in the folded status, by reporting that it is in a half-screen status.

As described with reference to FIG. 12 and FIG. 13, the change in the status of the housing may be reported by using the UE assistance information message. According to another embodiment, a variable UE capability information message may be used based on the status of the housing of the electronic device 101.

According to an embodiment, the electronic device 101 may report whether a second UE capability information message or a temporary UE capability information message is supported through the first UE capability information message. Additionally or alternatively to whether the second UE capability information message or the temporary UE capability information message is supported, it is also possible to indicate whether the electronic device 101 is a device (e.g., a foldable phone) in which the status of the housing can be changed. When the electronic device 101 reports that the second UE capability information message or the temporary capability information message is supported, the base station may allocate a resource capable of transmitting the second UE capability information message or the temporary capability information message to the electronic device 101 through an RRC message (e.g., dedicated signaling or broadcasting signaling). When it is identified that the folded status is changed, the electronic device 101 may transmit the second UE capability information message or the temporary capability information message through the resource allocated by the base station. For example, the second UE capability information message or the temporary capability information message may include only a parameter related to the status of the housing, which is capability information different from that in previous transmission. As another example, the second UE capability information message or the temporary capability information message may include all UE capabilities-related parameters.

Figure 14:
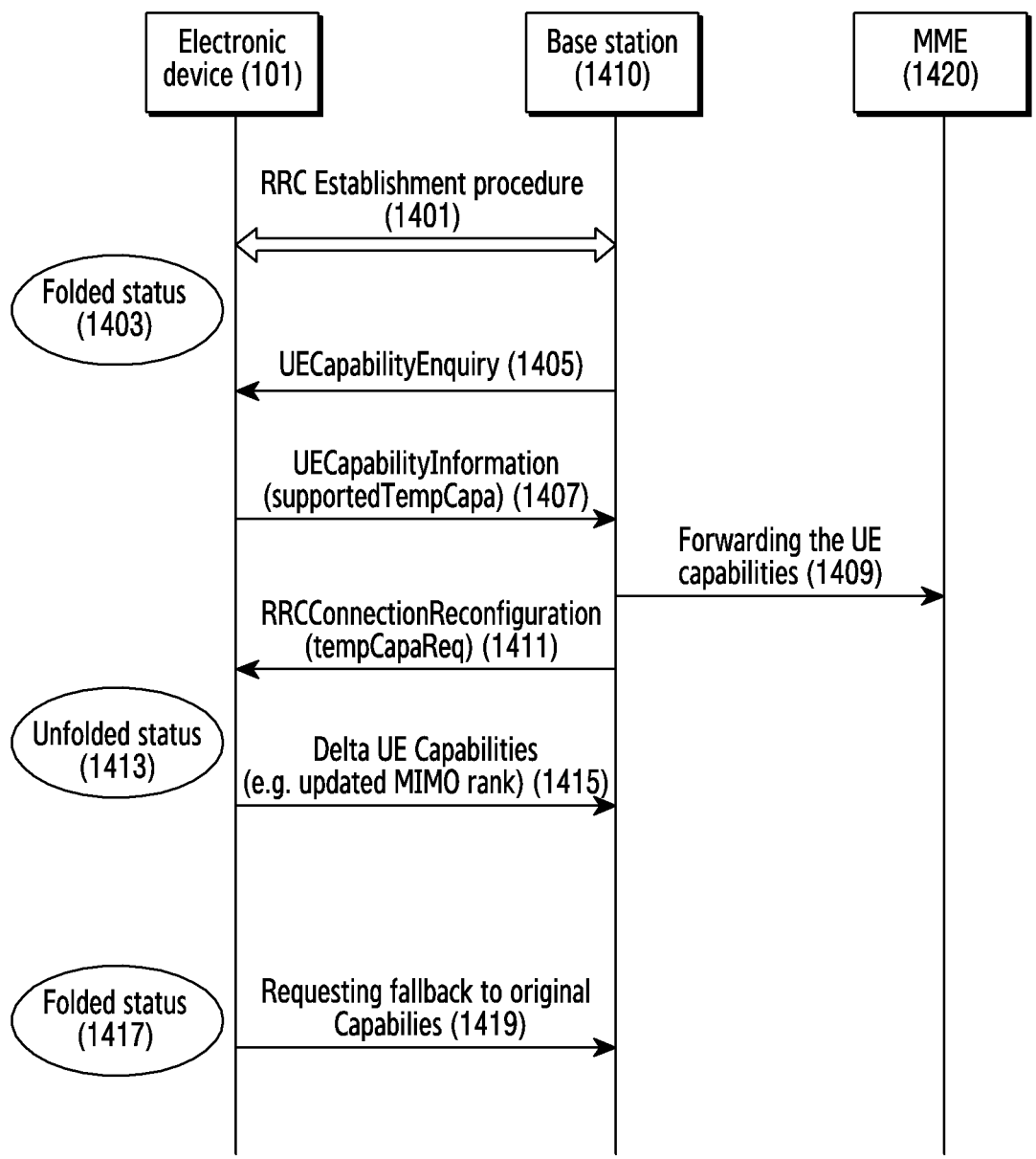
FIG. 14 is a signal exchange diagram for reporting a change in a status of a housing by using additional capability information signaling in an electronic device according to certain embodiments of the present disclosure.

FIG. 14 is a signal exchange diagram for reporting a change in a status of a housing by using additional capability information signaling in the electronic device 101 according to certain embodiments of the present disclosure.

According to an embodiment, in operation 1411, the base station 1410 may transmit an RRC connection reconfiguration message to the electronic device 101. The RRC connection reconfiguration message may include information (e.g., 'tempCapaReq') for a resource for transmitting the temporary capability information message. In operation 1413, the status of the housing of the electronic device 101 may be changed to an unfolded status. Since the status of the housing is changed to the unfolded status, in operation 1415, the electronic device 101 may transmit a delta UE capabilities information message to the base station 1410. The delta UE capabilities information message may include a parameter (e.g., an updated MIMO rank) of a value which varies depending on the status of the housing. The delta UE capabilities information message may be referred to as a second UE capability information message or a temporary UE capability information message. The delta UE capabilities information message may include at least one of 'Preferable data rate associated value(updated MCS/MIMO rank/ CA #/multiple BWPs/supported band/band combination/ total bandwidth)', 'Updated DRX cycle', 'Updated mobility parameter(TimeToTrigger)', 'measurement reconfiguration', 'Updated Power factors', and/or 'Updated feature set'.

According to an embodiment, in operation 1417, the status of the housing of the electronic device 101 may be changed to the folded status. Since the status of the housing of the electronic device 101 is changed to the folded status, in operation 1419, the electronic device 101 may transmit messages for requesting the base station 1410 to fallback to original capability information.

According to an embodiment, the prohibit timer may be further applied in the embodiment described with reference to FIG. 14. When the prohibit timer is applied, the prohibit timer may start after the changed status of the housing is reported in operation 1415. When the prohibit timer does not expire, even if the status of the housing is changed in operation 1417, a message for requesting to fallback to capability information may not be transmitted.

The embodiment described with reference to FIG. 14 is an example in which the status of the housing of the electronic device 101 is changed from the folded status to the unfolded status and back to the folded status. According to another embodiment, similar operations may be performed even if the status of the housing of the electronic device 101 is changed from the unfolded status to the folded status and back to the unfolded status. For example, the first UE capability information message may be transmitted based on the unfolded status, and when the electronic device 101 is in the folded status, changed capability information of the electronic device 101 may be reported by using the second device capability information message or the temporary capability information message. When the electronic device 101 is back to the unfolded status, the electronic device 101 may transmit a message requesting to return the setting to a value reported through the first UE capability information message.

When signaling of the second UE capability information message or temporary UE capability information message is used to change the status of the housing, a set value may be changed according to the status of the housing of the electronic device 101. Even if the electronic device 101 transitions to an idle mode or an inactive mode, the set value reported through the second UE capability information message or the temporary UE capability information message may be used until a third UE capability information message is transmitted.

The second UE capability information message or the temporary UE capability information message may include an indicator indicating that it is a device capable of changing the status of the housing. When the indicator is set to a first value (e.g., 1), all parameters included in the second UE capability information message or temporary UE capability information message or some parameters affected by a status of the housing can directly use the set value included in the second UE capability information message or temporary UE capability information message even if the status of the electronic device is changed.

Figure 15:
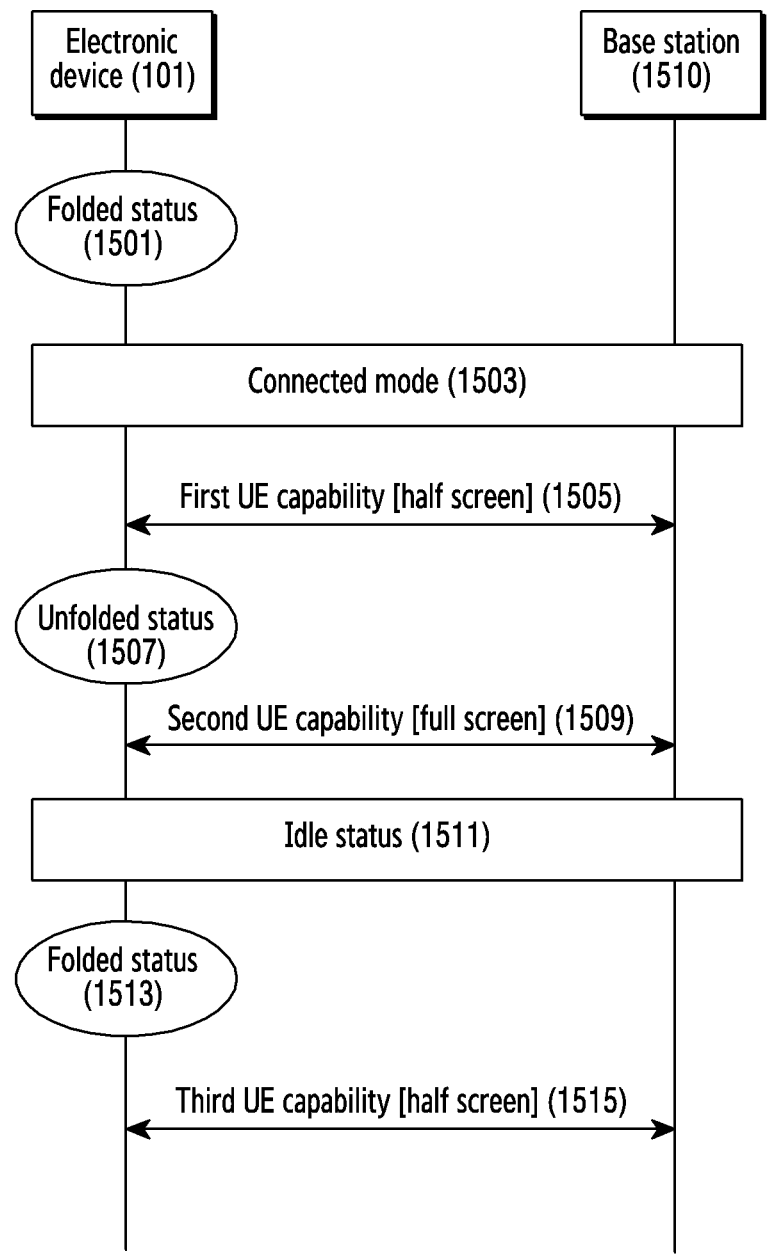
FIG. 15 is a signal exchange diagram for reporting a change in a status of a housing by using additional capability information signaling while an electronic device operates in an idle mode according to certain embodiments of the present disclosure.

FIG. 15 is a signal exchange diagram for reporting a change in a status of a housing by using additional capability information signaling while the electronic device 101 operates in an idle mode according to certain embodiments of the present disclosure.

Referring to FIG. 15, in operation 1501, the electronic device 101 may be in a folded status. In operation 1503, the electronic device 101 may access a base station 1510, and may operate in a connected mode. In operation 1505, the electronic device 101 and the base station 1510 may perform first UE capability information signaling. It may be reported that the electronic device 101 is in the folded status through the first UE capability information signaling. For example, it may be reported that it is in the folded status, by reporting that it is in a half-screen status. The half-screen status may be understood as a folded status in which a size of a display is decreased due to folding, compared to that in an unfolded status.

According to an embodiment, in operation 1507, the status of the housing of the electronic device 101 may be changed to the unfolded status. In operation 1509, the electronic device 101 and the base station 1510 may perform second UE assistance information signaling. It may be reported that the electronic device 101 is in the unfolded status through the second UE assistance information signaling. For example, it may be reported that it is in the unfolded status, by reporting that it is in a full-screen status. The full-screen status may be understood as an unfolded status in which a size of a display is increased due to unfolding, compared to that in the folded status.

According to an embodiment, in operation 1511, the electronic device 101 may transition to an idle mode. For example, since data transmission and reception for the electronic device 101 are not performed for at least a specific time, the electronic device 101 may operate in the idle mode under the control of the base station 1510. In operation 1513, the status of the housing of the electronic device 101 may be changed to the folded status. In operation 1515, the electronic device 101 and the base station 1510 may perform third UE capability information signaling. It may be reported that the electronic device 101 is in the folded status through the third UE capability information signaling. For example, it may be reported that it is in the folded status, by reporting that it is in a half-screen status.

Figure 16:
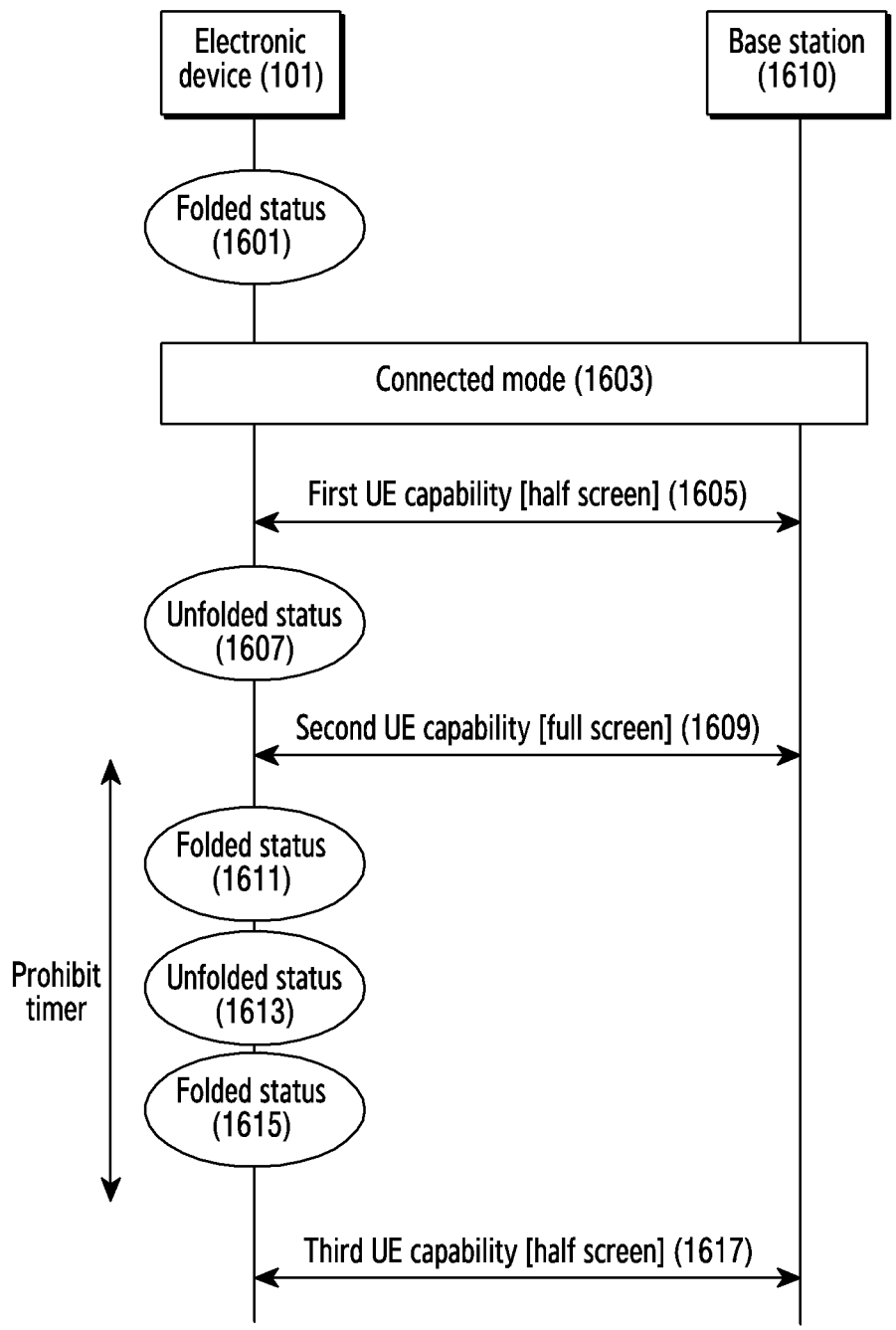
FIG. 16 is a signal exchange diagram for reporting information on a status of a housing on the basis of a prohibit timer by using additional capability information signaling in an electronic device according to certain embodiments of the present disclosure.

FIG. 16 is a signal exchange diagram for reporting information on a status of a housing on the basis of a prohibit timer by using additional capability information signaling in the electronic device 101 according to certain embodiments of the present disclosure.

Referring to FIG. 16, in operation 1601, the electronic device 101 may be in a folded status. In operation 1603, the electronic device 101 may access a base station 1610, and may operate in a connected mode. In operation 1605, the electronic device 101 and the base station 1610 may perform first UE capability information signaling. It may be reported that the electronic device 101 is in the folded status through the first UE capability information signaling. For example, it may be reported that it is in the folded status, by reporting that it is in a half-screen status. The half-screen status may be understood as a folded status in which a size of a display is decreased due to folding, compared to that in an unfolded status.

According to an embodiment, in operation 1607, the status of the housing of the electronic device 101 may be changed to the unfolded status. In operation 1609, the electronic device 101 and the base station 1610 may perform second UE assistance information signaling. It may be reported that the electronic device 101 is in the unfolded status through the second UE assistance information signaling. For example, it may be reported that it is in the unfolded status, by reporting that it is in a full-screen status. A prohibit timer may start when the second UE assistance information signaling is performed. The full-screen status may be understood as an unfolded status in which a size of a display is increased due to unfolding, compared to that in the folded status.

According to an embodiment, in operation 1611, the status of the housing of the electronic device 101 may be changed to the folded status. Since the prohibit timer has not expired, even if the status of the housing is changed, signaling for reporting the change in the status of the housing may not be performed. In operation 1613, the status of the housing of the electronic device 101 may be changed to the unfolded status. Although the signaling is not performed, a maintain timer may start according to the change in the status. In operation 1615, the status of the housing of the electronic device 101 may be changed to the folded status. Since the prohibit timer has expired and a last reported status (e.g., the unfolded status) is different from a current status (e.g., the folded status), in operation 1617, the electronic device 101 and the base station 1610 may perform third UE assistance information signaling. It may be reported that the electronic device 101 is in the folded status through the third UE assistance information signaling. For example, it may be reported that it is in the folded status, by reporting that it is in a half-screen status.

Figure 17:
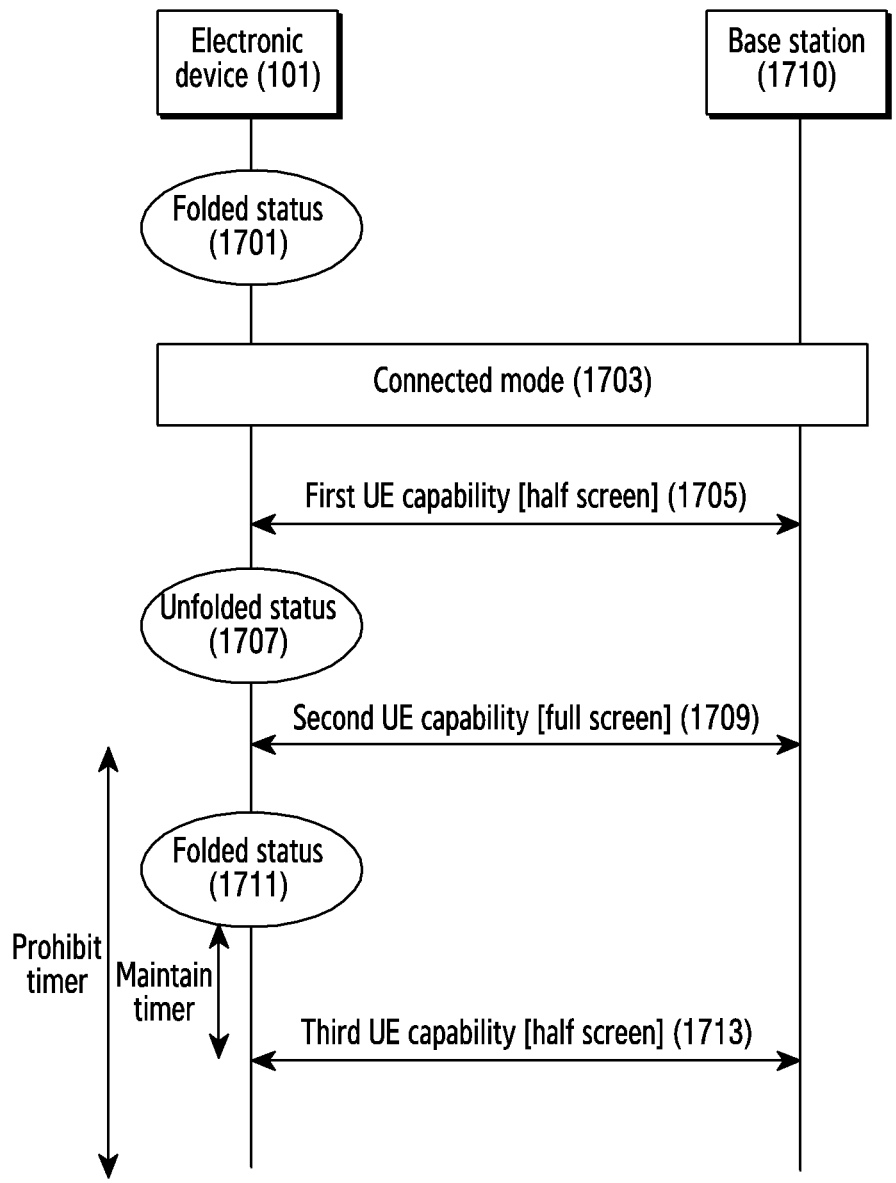
FIG. 17 is a signal exchange diagram for reporting information on a status of a housing on the basis of a prohibit timer and a maintain timer by using additional capability information signaling in an electronic device according to certain embodiments of the present disclosure.

FIG. 17 is a signal exchange diagram for reporting information on a status of a housing on the basis of a prohibit timer and a maintain timer by using additional capability information signaling in the electronic device 101 according to certain embodiments of the present disclosure.

Referring to FIG. 17, in operation 1701, the electronic device 101 may be in a folded status. In operation 1703, the electronic device 101 may access a base station 1710, and may operate in a connected mode. In operation 1705, the electronic device 101 and the base station 1710 may perform first UE capability information signaling. It may be reported that the electronic device 101 is in the folded status through the first UE capability information signaling. For example, it may be reported that it is in the folded status, by reporting that it is in a half-screen status. The half-screen status may be understood as a folded status in which a size of a display is decreased due to folding, compared to that in an unfolded status.

According to an embodiment, in operation 1707, the status of the housing of the electronic device 101 may be changed to the unfolded status. In operation 1709, the electronic device 101 and the base station 1710 may perform second UE assistance information signaling. It may be reported that the electronic device 101 is in the unfolded status through the second UE assistance information signaling. For example, it may be reported that it is in the unfolded status, by reporting that it is in a full-screen status. A prohibit timer may start when the second UE assistance information signaling is performed. The full-screen status may be understood as an unfolded status in which a size of a display is increased due to unfolding, compared to that in the folded status.

According to an embodiment, in operation 1711, the status of the housing of the electronic device 101 may be changed to the folded status. Since the prohibit timer has not expired, even if the status of the housing is changed, signaling for reporting the change in the status of the housing may not be performed. Although the signaling is not performed, a maintain timer may start according to the change in the status. Although the prohibit timer has not expired, since the maintain timer has expired, in operation 1713, the electronic device 101 and the base station 1710 may perform third UE assistance information signaling. It may be reported that the electronic device 101 is in the folded status through the third UE assistance information signaling. For example, it may be reported that it is in the folded status, by reporting that it is in a half-screen status.

According to certain embodiments of the present disclosure, a method of operating an electronic device (e.g., the electronic device 101) may include identifying a bending status of a housing (e.g., the housing 200) of the electronic device, setting a value of a parameter to be transmitted to a base station on the basis of the identified bending status of the housing, and transmitting a first message including the parameter to the base station.

According to certain embodiments of the present disclosure, the first message may include any one of a message for transferring capability information and a message for transferring assist information.

According to certain embodiments of the present disclosure, the first message may be transmitted when the electronic device initially accesses or when there is a change in the bending status of the housing.

According to certain embodiments of the present disclosure, the bending status of the housing may include a folded status and an unfolded status. The folded status may be divided into one or more statuses.

According to certain embodiments of the present disclosure, the parameter may include at least one of a parameter indicating the bending status of the housing, a parameter related to heating, a parameter related to the number of antenna ports, a parameter related to the number of layers supported in the electronic device, a parameter related to a size of a screen that can be displayed, a parameter related to the number of applications running in the electronic device, a parameter related to an activated display circuit, a parameter related to a User Equipment (UE) category, and a parameter related to channel quality.

According to certain embodiments of the present disclosure, the bending status of the housing (e.g., the housing 200) may be identified based on at least one of a measurement value of a sensor, a status of a display, a status of a display circuit, a type of a running application, and the number of running applications.

According to certain embodiments of the present disclosure, the method may further include detecting a change in the bending status of the housing (e.g., the housing 200), and transmitting a second message to notify the changed bending sate of the housing.

According to certain embodiments of the present disclosure, the second message may include at least one parameter related to the change in the bending status of the housing (e.g., the housing 200).

According to certain embodiments of the present disclosure, the method may further include detecting the change in the bending status of the housing (e.g., the housing 200), determining whether a specific time elapses after receiving the second message, and transmitting a third message to notify the changed bending status of the housing if the specific time elapses.

According to certain embodiments of the present disclosure, the method may further include detecting the change in the bending status of the housing (e.g., the housing 200), determining whether the change in the bending status of the housing is maintained for a specific time, and transmitting a third message to notifying the changed bending status of the housing if the change in the bending status of the housing is maintained for the specific time.

According to certain embodiments of the present disclosure, the method may further include receiving information on a resource allocated to transmit the second message.

According to certain embodiments of the present disclosure, the first message may include an indicator indicating that the electronic device (e.g., the electronic device 101) is a device capable of changing the bending status of the housing (e.g., the housing 200).

According to certain embodiments, a method of operating an electronic device comprises determining whether the electronic device is folded or unfolded; setting a value of a parameter based on whether the electronic device is folder or unfolded; and transmitting a first message comprising the parameter to a base station.

According to certain embodiments, the first message comprises any one of a message for transferring capability information and a message for transferring assist information.

According to certain embodiments, the first message is transmitted when the electronic device initially accesses or when the electronic device changes from folded to unfolded or vice versa.

According to certain embodiments, determining that the electronic device is folded comprises a determination of whether the electronic device is in an intermediate state According to certain embodiments, the parameter comprises at least one of a parameter indicating whether the electronic device is folder or unfolded, a parameter related to heating, a parameter related to the number of antenna ports, a parameter related to the number of layers supported in the electronic device, a parameter related to a size of a screen that can be displayed, a parameter related to the number of applications running in the electronic device, a parameter related to an activated display circuit, a parameter related to a User Equipment (UE) category, and a parameter related to channel quality.

According to certain embodiments, determining whether the electronic device is folded or unfolded is based on at least one of a measurement value of a sensor, a status of a display, a status of a display circuit, a type of a running application, and the number of running applications.

According to certain embodiments, the method further comprises detecting that the electronic device changed from folded to unfolded or vice versa; and transmitting a second message to indicating the change from folded to unfolded or vice versa to the base station.

According to certain embodiments, the second message comprises at least one parameter related to the change from folded to unfolded or vice versa.

According to certain embodiments, the method further comprises detecting the change the change from folded to unfolded or vice versa; determining whether a specific time elapses after receiving the second message; and transmitting a third message indicating the change from folded to unfolded or vice versa when the specific time elapses.

According to certain embodiments, the method further comprises: detecting the change from folded to unfolded or vice versa; determining whether the change from folded to unfolded or vice versa is maintained for a specific time; and transmitting a third message indicating the change from folded to unfolded or vice versa when maintained for the specific time.

According to certain embodiments, the method further comprises receiving information on a resource allocated to transmit the second message.

According to certain embodiments, the first message comprises an indicator indicating that the electronic device is a foldable device.

According to certain embodiments of the present disclosure, a method of operating a base station may include receiving, from an electronic device (e.g., the electronic device 101), a message including a parameter related to a bending status of a housing (e.g., the housing 200) of the electronic device, and determining a configuration related to the number of Multiple Input Multiple Output (MIMO) layers of the electronic device on the basis of a value of the parameter.

According to certain embodiments of the present disclosure, the parameter may include at least one of a parameter indicating the bending status of the housing (e.g., the housing 200), a parameter related to heating, a parameter related to the number of antenna ports, a parameter related to the number of layers supported in the electronic device (e.g., the electronic device 101), a parameter related to a size of a screen that can be displayed, a parameter related to the number of applications running in the electronic device, a parameter related to an activated display circuit, a parameter related to a User Equipment (UE) category, and a parameter related to channel quality.

According to certain embodiments of the present disclosure, the message may include any one of a message for transferring capability information and a message for transferring assist information.

According to certain embodiments, a method of operating a base station comprises receiving, from an electronic device, a message comprising a parameter related to whether the electronic device is folder or unfolded; determining a configuration related to the number of Multiple Input Multiple Output (MIMO) layers of the electronic device on the basis of a value of the parameter; and transmitting a signal to the electronic device based on the determined configuration related to the number of MIMO layers.

According to certain embodiments, the parameter comprises at least one of a parameter indicating whether the electronic device is folded or unfolded, a parameter related to heating, a parameter related to the number of antenna ports, a parameter related to the number of layers supported in the electronic device, a parameter related to a size of a screen that can be displayed, a parameter related to the number of applications running in the electronic device, a parameter related to an activated display circuit, a parameter related to a User Equipment (UE) category, and a parameter related to channel quality.

According to certain embodiments, the message comprises any one of a message for transferring capability information and a message for transferring assist information.

As described above, according to certain embodiments, at least one parameter explicitly or implicitly indicating the status of the housing of the electronic device 101 may be transmitted to the base station. For example, a parameter indicating the number of MIMO layers may be used, and a distribution of bands may be considered as shown in FIG. 18A and FIG. 18B.

Figure 18A:
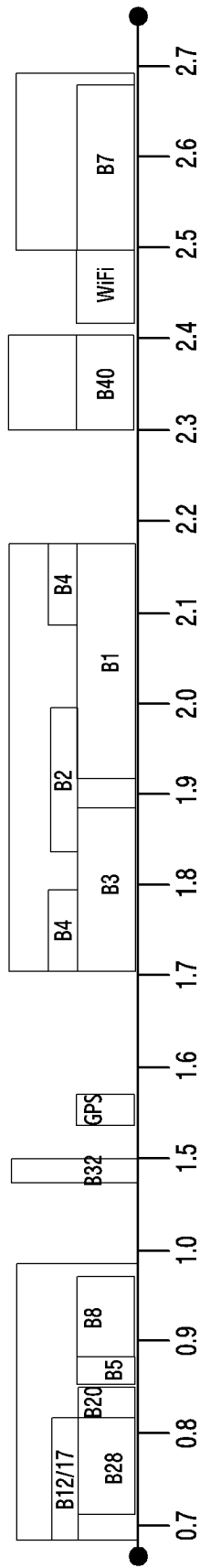
FIG. 18A is an example of bands that can be used in an electronic device according to certain embodiments of the present disclosure.
Figure 18B:
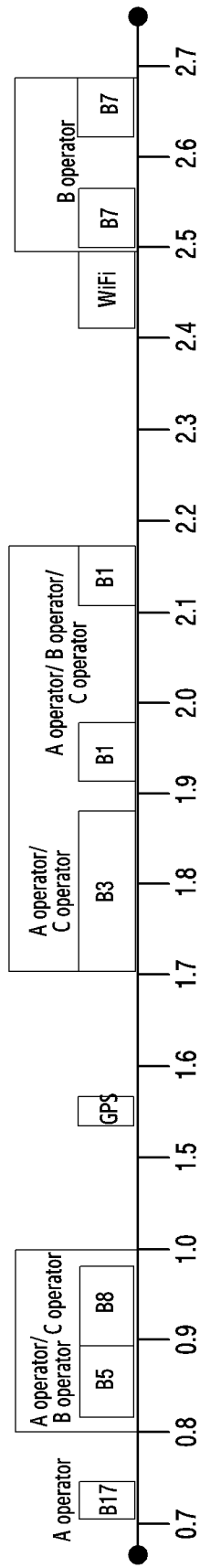
FIG. 18B is an example of bands that can be used in an electronic device according to certain embodiments of the present disclosure.

FIG. 18A and FIG. 18B are examples of bands that can be used in the electronic device 101 according to certain embodiments of the present disclosure.

Referring to FIG. 18A, at least one of B12/17, B20, B28, B5, and B8 may be included in one band combination, B32 may be included in one band combination, at least one of B1, B2, B3, and B4 may be included in one band combination, B40 may be included in one band combination, and B7 may be included in one band combination. Referring to FIG. 18B, at least one of B5 and B8 may be included in one band combination, at least one of B1 and B3 may be included in one band combination, and B7 may be included in one band combination.

Figure 19:
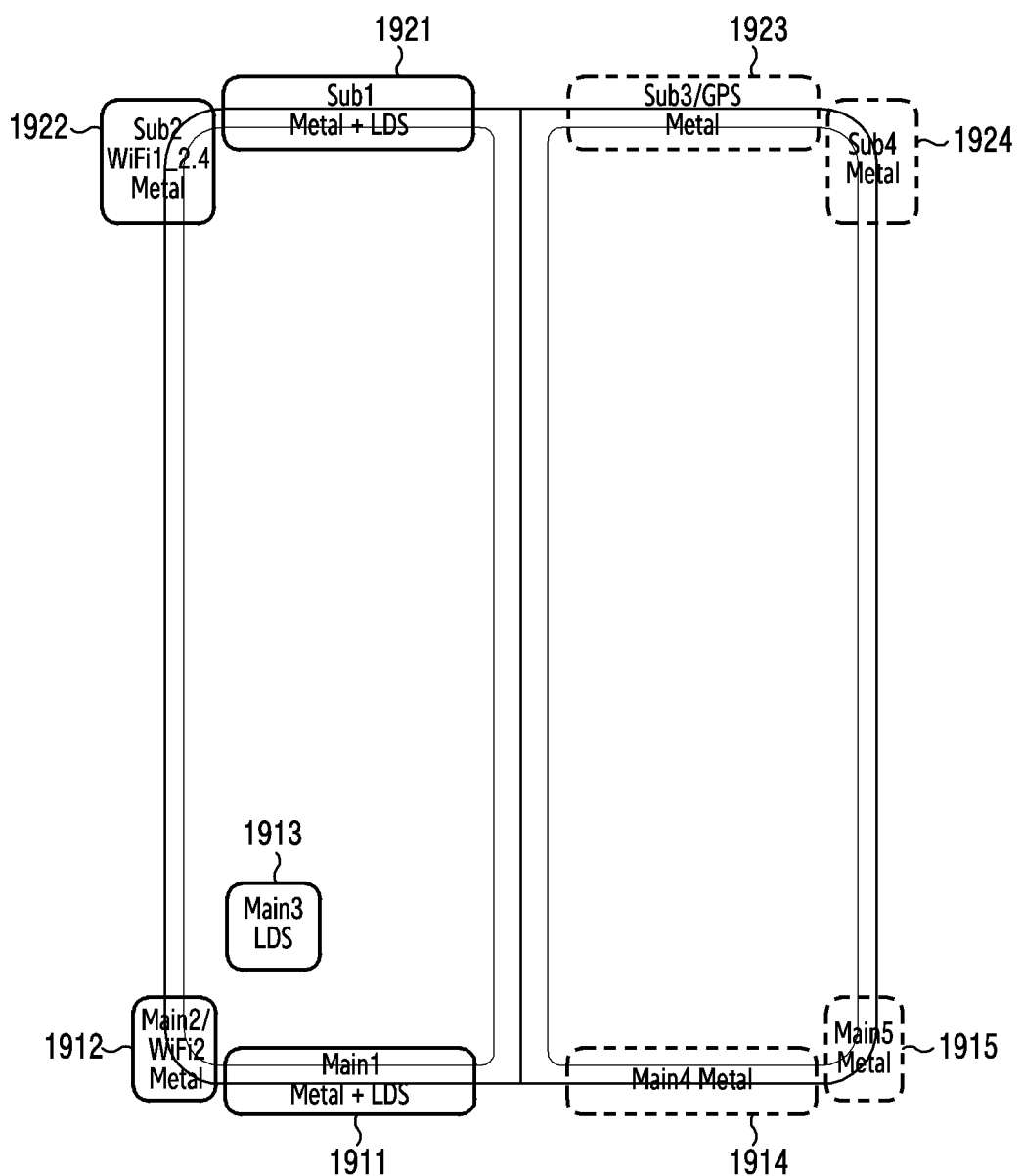
FIG. 19 is an example of disposing an antenna of an electronic device in an unfolded status according to certain embodiments of the present disclosure.

FIG. 19 is an example of disposing an antenna of the electronic device 101 in an unfolded status according to certain embodiments of the present disclosure. Regions 1911 to 1915 and 1921 to 1924 of FIG. 19 are regions in which an antenna can be disposed. At least part of the corresponding antenna may be disposed to be included in each region.

Referring to FIG. 19, the disposition of the antenna in the unfolded status may be designed by considering a transmission layer and transmission band (e.g., low band, mid band, high band) supporting MIMO. A Main1 antenna region 1911, a Main2 antenna region 1912, and a Main3 antenna region 1913 may be disposed to a lower left end, and a Main4 antenna region 1914 and a Main5 antenna region 1915 may be disposed to a lower right end. A Sub1 antenna region 1921 and a Sub2 antenna region 1922 may be disposed to an upper left end, and a Sub3 antenna region 1923 and a Sub4 antenna region 1924 may be disposed to an upper left end. For example, a metal antenna with Laser Direct Structuring (LDS) may be disposed to the Main1 antenna region 1911, a metal antenna may be disposed to the Main2 antenna region 1912, an antenna with LDS may be disposed to the Main3 antenna region 1913, a metal antenna may be disposed to the Main4 antenna region 1914, a metal antenna may be disposed to the Main5 antenna region 1915, a metal antenna with LDS may be disposed to the Sub1 antenna region 1912, a metal antenna may be disposed to the Sub2 antenna region 1922, a metal antenna may be disposed to the Sub3 antenna region 1923, and a metal antenna may be disposed to the Sub4 antenna region 1924. Some antennas may be shared for another usage. For example, antennas disposed to the Main2 antenna region 1912 and/or the Sub2 antenna region 1922 may be used for a WiFi signal, and an antenna disposed to the Sub3 antenna region 1923 may be used for a GPS signal.

Ranges of bands supported in each antenna may be different from each other. For example, the antenna disposed to the Main1 antenna region 1911 may support all of the low band/mid band/high band. When the number of layers supporting MIMO increases, the number of antenna ports may increase according to the number of layers. In this case, a supported default port may be extended. Which antenna combination is a default antenna combination may be defined according to the number of ports. Based on the default antenna combination, the electronic device 101 may control power of RF circuits and/or antennas. The default antenna combination based on the number of ports may vary depending on the status of the housing of the electronic device 101. Since the number of antennas available in the unfolded status is greater than the number of antennas available in the folded status, a greater number of ports can be supported in the unfolded status, and various combinations can be defined. Table 15 below illustrates examples of default antenna combinations in the folded status, and Table 16, Table 17, and Table 18 below illustrate examples of default antenna combinations in the unfolded status.

For example, in Table 16, the electronic device 101 may operate by mapping various antenna units as follows in implementation by default according to a port configuration of a base station in an unfolded status or a full-screen status.

As shown in Table 16, when the base station instructs the electronic device 101 to set 2 ports at high bands, the electronic device 101 may support a transmission/reception operation based on Main1+Sub2 antenna units. If it is intended to obtain a great diversity gain, the electronic device 101 may operate based on an antenna setting in which antenna units are spaced far apart from each other as shown in Table 18. In this case, a channel status between antennas may be changed due to folding/unfolding of the electronic device 101.

On the other hand, when a user rotates the electronic device 101 as in a landscape mode to grip a display at one side, the electronic device 101 may operate by mapping one side of an antenna which is not gripped as shown in Main1+Sub4 of Table 17 or Main4+Sub4 of Table 18.

TABLE 15

|  | 1 Port | 2 Ports | 4 Ports |
|---|---|---|---|
| Mid Band | Main1 | Main1 + Sub1 | Not supported |
| High Band | Main1 | Main1 + Sub2 | Not supported |
| Low Band | Main1 | Main1 + Sub1 | Not supported |

TABLE 16

|  | 1 Port | 2 Ports | 4 Ports |
|---|---|---|---|
| Mid Band | Main1 | Main1 + Sub1 | Main1 + Sub1 + Main2 + sub2 |
| High Band | Main1 | Main1 + Sub2 | Main1 + Sub2 + Main5 + sub3 |
| Low Band | Main1 | Main1 + Sub1 | Main1 + Sub1 |

TABLE 17

|  | 1 Port | 2 Ports | 4 Ports |
|---|---|---|---|
| Mid Band | Main4 | Main4 + Sub3 | Main4 + Sub3 + Main2 + Sub1 |
| High Band | Main4 | Main4 + Sub4 | Main4 + Sub4 + Main5 + sub 1 |
| Low Band | Main4 | Main4 + Sub3 | Main4 + Sub3 + (sub1 + Main1) |

TABLE 18

|  | 1 Port | 2 Ports | 4 Ports |
|---|---|---|---|
| Mid Band | Main1 | Main1 + Sub3 | Main1 + Sub3 + Main2 + Sub1 |
| High Band | Main1 | Main1 + Sub4 | Main1 + Sub4 + Main5 + sub 1 |
| Low Band | Main1 | Main1 + Sub3 | Main1 + Sub3 + (sub1 + Main4) |

Default antenna combinations illustrated in Table 15 to Table 18 are one embodiment according to the number of ports, and may be added or changed as the number of ports increases, and may be defined differently according to performance. According to another embodiment, in the unfolded status, the electronic device 101 may consider a plurality of default antenna combinations. According to another embodiment, in the unfolded status, the electronic device 101 may selectively use any one of the plurality of default antenna combinations depending on a service scenario in use, a required throughput, a grip status of the electronic device 101, a heating status, and/or a remaining battery power status. The selection of the default antenna combination may be handled by a modem (e.g., the wireless communication module 192 or a communication processor).

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable sto95rage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method of operating an electronic device, the electronic device comprising a plurality of antennas, the method comprising:
   determining whether the electronic device is folded or unfolded:
   in response to the electronic device is unfolded, supporting a first number of Multiple Input Multiple Output (MIMO) layers,
   in response to the electronic device is folded, supporting a second number of Multiple Input Multiple Output (MIMO) layers,
   determining a value of a parameter including a number of layers supported in the electronic device based on whether the electronic device is folded or unfolded; and
   transmitting a first message comprising the parameter to a base station.

2. The method of claim 1, wherein the first message comprises any one of a message for transferring capability information and a message for transferring assist information.

3. The method of claim 1, wherein the first message is transmitted when the electronic device initially accesses or when the electronic device changes from folded to unfolded or vice versa.

4. The method of claim 1, wherein determining that the electronic device is folded comprises a determination of whether the electronic device is in an intermediate state.

5. The method of claim 1, wherein the parameter further comprises at least one of a parameter related to heating, a parameter related to a number of antenna ports, parameter related to a number of applications running in the electronic device, a parameter related to an activated display circuit, a parameter related to a User Equipment (UE) category, and a parameter related to channel quality.

6. The method of claim 1, wherein determining whether the electronic device is folded or unfolded is based on at least one of a measurement value of a sensor, a status of a display, a status of a display circuit, a type of a running application, and a number of running applications.

7. The method of claim 1, further comprising:
detecting that the electronic device changed from folded to unfolded or vice versa; and
transmitting a second message to indicating the change from folded to unfolded or vice versa to the base station.

8. The method of claim 7, wherein the second message comprises at least one parameter related to the change from folded to unfolded or vice versa.

9. The method of claim 7, further comprising:
detecting the change the change from folded to unfolded or vice versa;
determining whether a specific time elapses after receiving the second message; and
transmitting a third message indicating the change from folded to unfolded or vice versa when the specific time elapses.

10. The method of claim 7, further comprising:
detecting the change from folded to unfolded or vice versa;
determining whether the change from folded to unfolded or vice versa is maintained for a specific time; and
transmitting a third message indicating the change from folded to unfolded or vice versa when maintained for the specific time.

11. The method of claim 7, further comprising receiving information on a resource allocated to transmit the second message.

12. The method of claim 1, wherein the first message comprises an indicator indicating that the electronic device is a foldable device.

13. An electronic device comprising:
a housing capable of changing a shape;
a plurality of antennas;
a communication module disposed inside the housing; and
at least one processor disposed inside the housing and coupled to the communication module,
wherein the at least one processor is configured to:
determine whether the electronic device is folded or unfolded;
in response to the electronic device is unfolded, control the plurality of antennas to support a first number of Multiple Input Multiple Output (MIMO) layers,
in response to the electronic device is folded, control the plurality of antennas to support a second number of Multiple Input Multiple Output (MIMO) layers,
determine a value of a parameter including a number of layers supported in the electronic device based on whether electronic device is folded or unfolded; and
transmit a first message comprising the parameter to a base station.

14. The electronic device of claim 13, wherein the first message comprises any one of a message for transferring capability information and a message for transferring assist information.

15. The electronic device of claim 13, wherein the first message is transmitted when the electronic device initially accesses whether the electronic device is folded or unfolded or when the electronic device changes from folded to unfolded or vice versa.

16. The electronic device of claim 13, wherein determining that the electronic device is folded comprises includes a determination of at least one additional status.

17. The electronic device of claim 13, wherein the parameter further comprises, a parameter related to heating, a parameter related to a number of antenna ports, a parameter related to a number of applications running in the electronic device, a parameter related to an activated display circuit, a parameter related to a User Equipment (UE) category, and a parameter related to channel quality.

18. The electronic device of claim 13, wherein determining whether the electronic device is folded or unfolded is based on at least one of a measurement value of a sensor, a status of a display, a status of a display circuit, a type of a running application, and a number of running applications.

19. The electronic device of claim 13, wherein the at least one processor is configured to:
detect that the electronic device has changed from folded to unfolded or vice versa; and
transmit a second message to indicate the change.

20. The electronic device of claim 13, wherein the first message comprises an indicator indicating that the electronic device is foldable.

21. A method of operating a base station, the method comprising:
receiving, from an electronic device, a message comprising a parameter related to whether the electronic device is folded or unfolded;
determining a configuration related to a number of Multiple Input Multiple Output (MIMO) layers of the electronic device on the basis of a value of the parameter; and
transmitting a signal to the electronic device based on the determined configuration related to the number of MIMO layers.

22. The method of claim 21, wherein the parameter comprises at least one of a parameter indicating whether the electronic device is folded or unfolded, a parameter related to heating, a parameter related to a number of antenna ports, a parameter related to a number of layers supported in the electronic device, a parameter related to a size of a screen that can be displayed, a parameter related to a number of applications running in the electronic device, a parameter related to an activated display circuit, a parameter related to a User Equipment (UE) category, and a parameter related to channel quality.

23. The method of claim 21, wherein the message comprises any one of a message for transferring capability information and a message for transferring assist information.

* * * * *